US010642947B2

(12) United States Patent
Sinanoglu et al.

(10) Patent No.: US 10,642,947 B2
(45) Date of Patent: May 5, 2020

(54) SYSTEM, METHOD AND COMPUTER-ACCESSIBLE MEDIUM PROVIDING SECURE INTEGRATED CIRCUIT CAMOUFLAGING FOR MINTERM PROTECTION

(71) Applicant: New York University, New York, NY (US)

(72) Inventors: Ozgur Sinanoglu, Abu Dhabi (AE); Jeyavijayan Rajendran, Brooklyn, NY (US); Muhammad Yasin, Abu Dhabi (AE)

(73) Assignee: New York University, New York, NY (US)

(*) Notice: Subject to any disclaimer, the term of this patent is extended or adjusted under 35 U.S.C. 154(b) by 4 days.

(21) Appl. No.: 15/697,139

(22) Filed: Sep. 6, 2017

(65) Prior Publication Data
US 2018/0232479 A1    Aug. 16, 2018

Related U.S. Application Data

(60) Provisional application No. 62/383,720, filed on Sep. 6, 2016.

(51) Int. Cl.
*G06F 17/50* (2006.01)
*G06F 21/14* (2013.01)
*G06F 21/75* (2013.01)

(52) U.S. Cl.
CPC ........ *G06F 17/5068* (2013.01); *G06F 17/505* (2013.01); *G06F 17/5045* (2013.01); *G06F 21/14* (2013.01); *G06F 21/75* (2013.01)

(58) Field of Classification Search
USPC .................................................. 716/100–109
See application file for complete search history.

(56) References Cited

U.S. PATENT DOCUMENTS

| | | | |
|---|---|---|---|
| 6,651,225 B1* | 11/2003 | Lin | G06F 17/5022 |
| | | | 716/113 |
| 7,195,931 B2 | 3/2007 | Jarvis et al. | |
| 8,111,089 B2 | 2/2012 | Cocchi et al. | |
| | | (Continued) | |

OTHER PUBLICATIONS

Sam et al. "Security Analysis of Integrated Circuit Camouflaging" Nov. 4, 2013 ACM pp. 709-720 (Year: 2013).*

(Continued)

*Primary Examiner* — Binh C Tat
(74) *Attorney, Agent, or Firm* — Hunton Andrews Kurth LLP

(57) ABSTRACT

Exemplary embodiments of the present disclosure can include an exemplary system, method and computer-accessible medium for camouflaging a design of an integrated circuit(s) (IC), can include, for example, receiving information related to a plurality of input combinations to the ICs, and camouflaging the design of the ICs by limiting a discriminating ability of the input combination to a predetermined constant number of incorrect assignments. An incorrect output can be intentionally produced for a predetermined constant number of secret minterms of the ICs. An output of the ICs can be restored for the secret minterms using a CamoFix block. The CamoFix block can include a CamoInputMapping block(s), a CamoSecGen block(s) or a comparator block(s).

18 Claims, 11 Drawing Sheets

(56) References Cited

U.S. PATENT DOCUMENTS 8,151,235 B2  4/2012  Chow et al.
8,856,704 B2* 10/2014 Baeg .................. G06F 17/5068
                                                716/110

OTHER PUBLICATIONS

Alkabani, Yousra M. et al., "Active Hardware Metering for Intellectual Property Protection and Security," 16th USENIX Security Symposium, pp. 291-306, 2007.
Baumgarten, Alex et al., "Preventing IC Piracy Using Reconfigurable Logic Barriers," IEEE Design & Test of Computers, vol. 27, No. 1, pp. 66-75, 2010.
Becker, Georg T. et al., "Stealthy Dopant-Level Hardware Trojans: Extended Version," J. Cryptogr. Eng. vol. 4, pp. 19-31, 2014.
Bi, Yu et al., "Leveraging Emerging Technology for Hardware Security—Case Study on Silicon Nanowire FETs and Graphene SymFETs," IEEE 23rd Asian Test Symposium, pp. 342-347, 2014.
Biere, Armin "Lingeling, Plingeling and Treengeling Entering the SAT Competition," Proc. SAT Competition, pp. 51-52, 2013.
Chakraborty, Rajat Subhra et al., "HARPOON: An Obfuscation-Based SoC Design Methodology for Hardware Protection," IEEE Transactions on Computer-Aided Design of Integrated Circuits and Systems, vol. 28, No. 10, pp. 1493-1502, 2009.
Chen, Shuai et al., "Chip-Level Anti-Reverse Engineering using Transformable Interconnects," IEEE Defect and Fault Tolerance in VLSI and Nanotechnology Systems, pp. 109-114, 2015.
Torrance, Randy et al., "The State-of-the-Art in IC Reverse Engineering," IEEE/ACM Design Automation Conference, pp. 333-338, 2011.
Chipworks. Reverse Engineering Software. http://www.chipworks.com/en/technical-competitive-analysis/resoruces/reerse-engineering-software, Mar. 15, 2016.
James, Dick, "Intel Ivy Bridge Unveiled—The First Commerical Tri-Gate, High-k, Metal-Gate CPU," IEEE, pp. 1-4, 978-1-4673-1556, 2012.
Cocchi, Ronald P. et al., "Circuit Camouflage Integration for Hardware IP Protection," IEEE/ACM Design Automation Conference, pp. 1-5, 2014.
Degate http://www.degate.org/documentation/, Dec. 22, 2015.
Hansen, Mark C. et al., "Unveiling the ISCAS-85 Benchmarks: A Case Study in Reverse Engineering," IEEE Design & Test of Computers, vol. 16, No. 3, pp. 72-80, 1999.
Kanuparthi, Arun K. et al., "Feasibility Study of Dynamic Trusted Platform Module," IEEE international Conference on Computer Design, pp. 350-355, 2010.
Karimi, Naghmeh et al., "On the Correlation Between Controller Faults and Instruction-Level Errors in Modern Microprocessors," IEEE International Test Conference, pp. 1-10, 2008.
Koushanfar, Farinaz "Provably Secure Active IC Metering Techniques for Piracy Avoidance and Digital Rights Management," IEEE Transactions on Information Forensics and Security, vol. 7, No. 1, pp. 51-63, Feb. 2012.
Koushanfar, Farinaz "Integrated Circuits Metering for Piracy Protection and Digital Rights Management: An Overview," Great Lakes Synposium on VLSI, pp. 449-454, 2011.
Lee, Ruby B. et al., "Enlisting Hardware Architecture to Thwart Malicious Code Injection," International Conference on Security in Pervasive Computing, pp. 1-15, 2003.
Liu, Duo et al., "Oracle-Guided Incremental SAT Solving to Reverse Engineer Camouflaged Logic Circuits," Design, Automation and Test in Europe, pp. 433-438, 2016.
Malik, Shweta et al., "Development of a Layout-Level Hardware Obfuscation Tool," IEEE Computer Society Annual Symposium on VLSI, pp. 204-209, 2015.
El Massad, Mohamed et al., "Integrated Circuit (IC) Decamouflaging: Reverse Engineering Camouflaged ICs within Minutes," Network and Distributed System Security Symposium. pp. 1-14, 2015.
Mukherjee, Shubhendu S. et al., "Measuring Architectural Vulnerability Factors," IEEE Micro, vol. 23, No. 6, pp. 70-75, 2003.
Nourani, Mehrdad et al., "Synthesis-for-Testability of Controller-Datapath Pairs that use Gated Clocks," IEEE/ACM Design Automation Conference, pp. 613-618, 2000.
Oracle. OpenSPARC T1 Micro Architecture Specification http://www.oracle.com/technetworks/systems/opensparc/t1-01-opensparc1-micro-arch-1538959.html., Mar. 30, 2016.
Rajendran, Jeyavijayan et al., "Security Analysis of Integrated Circuit Camouflaging," ACM Conference on Computer and Communications Security, pp. 709-720, 2013.
Rajendran, Jeyavijayan et al., "Security Analysis of Logic Obfuscation," IEEE/ACM Design Automation Conference, pp. 83-89, 2012.
Rostami, Masoud et al., "A Primer on Hardware Security: Models, Methods, and Metrics," Proceedings of the IEEE, vol. 102, No. 8, pp. 1283-1295, 2014.
Roy, Jarrod A. et al., "Ending Piracy of Integrated Circuits," IEEE Computer, vol. 43, No. 10, pp. 30-38, 2010.
SEMI, Innovation is at Risk as Semiconductor Equipment and Materials Industry Loses up to $4 Billion Annually due to IP Infringement www.semi.org/en/Press/P043775, 2008 and Nov. 15, 2015.
Subramanyan, Pramod et al., "Reverse Engineering Digital Circuits Using Functional Analysis," Design Automation and Test in Europe, pp. 1277-1280, 2013.
SypherMedia. Syphermedia Library http://www.smi.tv/syphermedia_library_circuit_comouflage_technology.html, Apr. 22, 2016.
Waksman, Adam et al., "Tamper Evident Microprocessors," IEEE Symposium of Security and Privacy, pp. 173-188, 2010.
Chipworks. Texas Instructments (UMC 65nm Fabricated) 4377401 GSM Baseband Processor Transistor Characterization Report http://www.techinsights.com/reports-and-subscriptions/open-market-reports/Report-Profile/?ReportKey=TCR-0612-803.
Chipworks. Texas Instruments (UMC Fabricated) 4377401 GSM Baseband Processor 65 nm Structural Analysis Report http://www.techinsights.com/reports-and-subscriptions/open-market-reports/Report-Profile/?ReportKey=SAR-0612-804.
Chipworks. Texas Instruments 4377401 Baseband Processor TSMC 65nm Process Transistor Characterization http://www.chipworks.com/TOC/TI_4377401_TSMC_Bb_Processor_TCR-0703-801_TOC.pdf, Nov. 15, 2015.

* cited by examiner

205

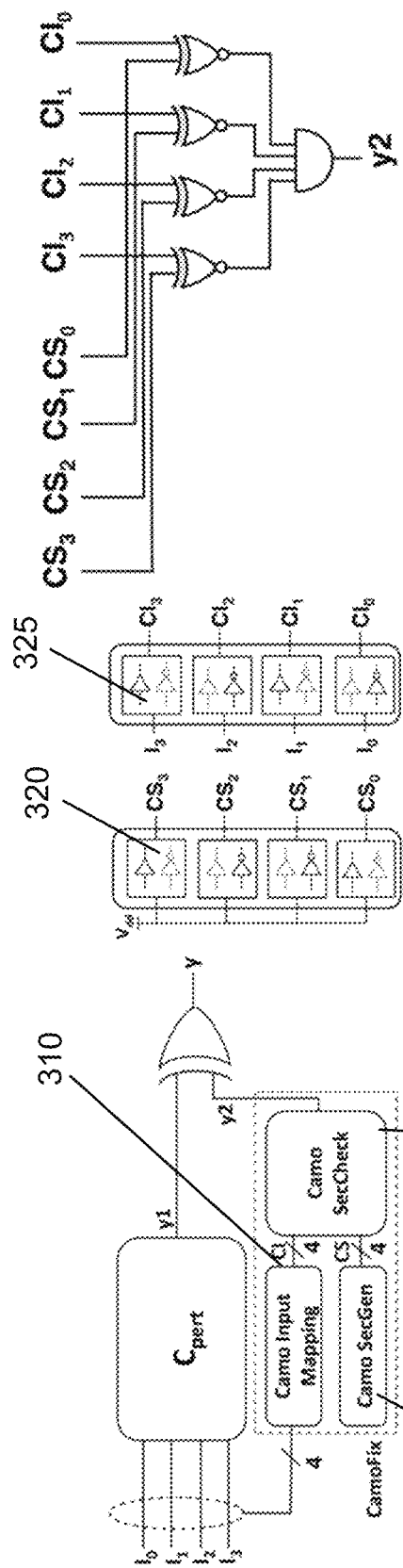

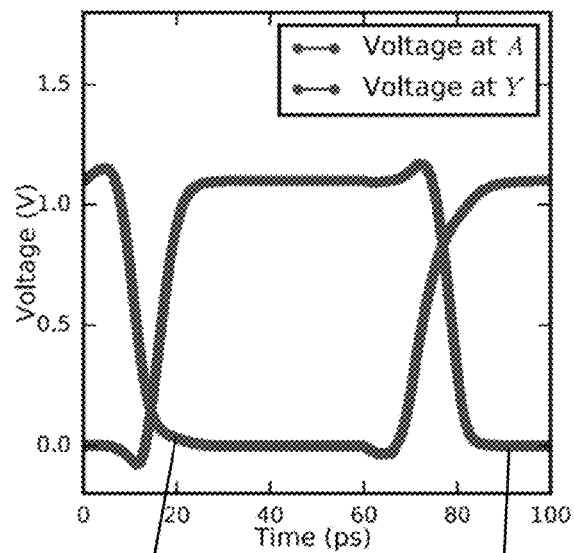 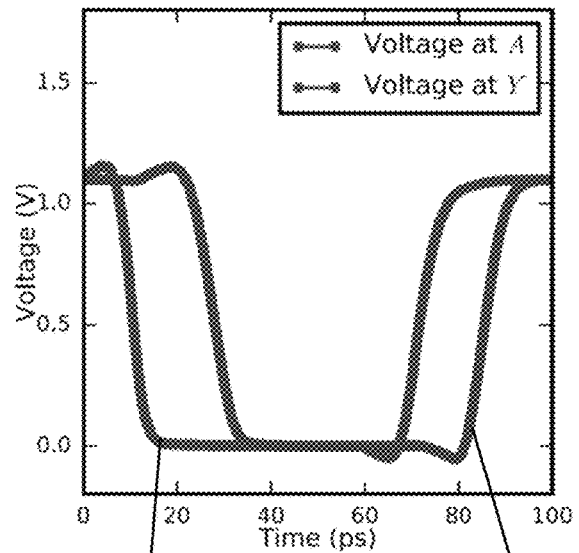
Figure 5A
Figure 5B

SYSTEM, METHOD AND COMPUTER-ACCESSIBLE MEDIUM PROVIDING SECURE INTEGRATED CIRCUIT CAMOUFLAGING FOR MINTERM PROTECTION

CROSS-REFERENCE TO RELATED APPLICATION(S)

This application relates to and claims priority from U.S. Patent Application No. 62/383,720, filed on Sep. 6, 2017, the entire disclosure of which is incorporated herein by reference.

FIELD OF THE DISCLOSURE

The present disclosure relates generally to integrated circuit ("IC") camouflaging, and more specifically, to exemplary embodiments of an exemplary system, method and computer-accessible-medium providing secure IC camouflaging for minterm protection.

BACKGROUND INFORMATION

The semiconductor industry loses billions of dollars each year due to Intellectual Property ("IP") infringement (See, e.g. Reference 30). A major facilitator of IP piracy attacks is reverse engineering. (See, e.g., References 28 and 33). Reverse engineering facilitates an attacker to identify the device technology used in an IC, an IC's functionality and/or its design. (See, e.g., Reference 33). Reverse engineering of an IC can involve depackaging, delayering and imaging the individual layers, annotating the images, and extracting the netlist of the design.

Many commercial ICs, such as Texas Instruments ("TI") 4377401 baseband processor (see, e.g., Reference 34), and Intel's 22 nm Xeon processor (see, e.g., Reference 11), have been reported to have been successfully reverse engineered. Commercial, as well as open-source, tools, for revere engineering are available. (See, e.g., References 10 and 13). Although reverse engineering has been primarily devised for verifying commercial piracy and patent infringements, it can also be misused by an attacker to steal the IP. (See, e.g., Reference 28).

Thus, it may be beneficial to provide an exemplary system, method and computer-accessible medium providing secure IC camouflaging for minterm protection, which can overcome at least some of the deficiencies described herein above.

SUMMARY OF EXEMPLARY EMBODIMENTS

Exemplary embodiments of the present disclosure can include an exemplary system, method and computer-accessible medium for camouflaging a design of an integrated circuit(s) (IC(s)), which can include, for example, receiving information related to a plurality of input combinations to the IC(s), and camouflaging the design of the IC(s) by limiting a discriminating ability of the input combination to a predetermined constant number of incorrect assignments. An incorrect output can be intentionally produced for a predetermined constant number of secret minterms of the IC(s). An output of the ICs can be restored for the secret minterms using a CamoFix block. The CamoFix block can include a CamoInputMapping block(s), a CamoSecGen block(s) or a comparator block(s).

In some exemplary embodiments of the present disclosure, the CamoSecGen block(s) can be utilized to produce an on-chip secret information based on a camouflaged gate(s). The CamoInputMapping block(s) can be utilized to transform the input combinations based on a camouflaged gate(s). The comparator block(s) can be utilized to produce a restore signal(s) if an on-chip secret(s) matches a transformed circuit input(s). The CamoFix block can include an inverter camouflaged gate(s) or (ii) a buffer camouflaged gate(s). The IC(s) can be split or otherwise separated into a perturbed logic circuit(s) and a CamoFix block(s). The perturbed logic circuit(s) can be generated by (i) adding a minterm(s) to the IC(s) or (ii) erasing the minterm(s) from the IC(s).

In some exemplary embodiments of the present disclosure, the minterm(s) can be erased by replacing an XOR gate(s) in the IC(s) with a NAND gate(s). The CamoFix block(s) can be used to, e.g., (i) remove a perturbation from the perturbed logic circuit(s) or (ii) restore a perturbation from the perturbed logic circuit(s). The CamoFix block can include (i) an inverter camouflaged gate(s) and/or (ii) a buffer camouflaged gate(s). The inverter camouflaged gate(s) and/or the buffer camouflaged gate(s) can include a dummy contact(s). The inverter camouflaged gate(s) and/or the buffer camouflaged gate(s) can be used to generate a camouflaged secret signal(s). In certain exemplary embodiments of the present disclosure, only a controller(s) of the design can be camouflaged, which can be performed by flipping a critical output(s) of the controller(s).

A further exemplary embodiment of the present disclosure can include at circuit configuration, which can include, for example an integrated circuit(s) (IC) having a discriminating ability for every input combination to the IC(s), the discriminating ability being limited to a predetermined constant number of incorrect assignments.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 3A is an exemplary circuit diagram of the exemplary CamoPerturb architecture according to an exemplary embodiment of the present disclosure;

FIG. 3B is an exemplary circuit diagram of a camouflaged secret generated from an array of camouflaged gates according to an exemplary embodiment of the present disclosure;

FIG. 3C is an exemplary circuit diagram of camo input mapping according to an exemplary embodiment of the present disclosure;

FIG. 3D is an exemplary circuit diagram of a camo security check according to an exemplary embodiment of the present disclosure;

FIG. 5A is an exemplary graph illustrating the input-Output characteristics when the camouflaged inverter/buffer cell is configured as an inverter according to an exemplary embodiment of the present disclosure;

FIG. 5B is an exemplary graph illustrating the input-Output characteristics when the camouflaged inverter/buffer cell is configured as a buffer according to an exemplary embodiment of the present disclosure;

Figures 1A, 1B:
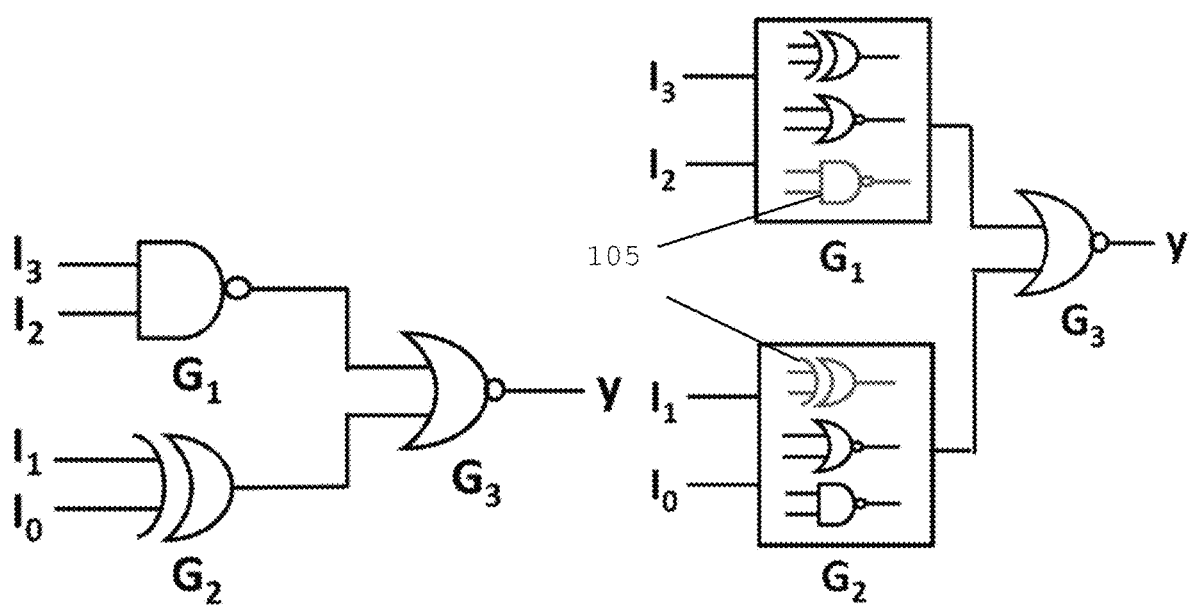
FIG. 1A is an exemplary circuit diagram of an original circuit $C_{orig}$, according to an exemplary embodiment of the present disclosure.
FIG. 1B is an exemplary circuit diagram of a camouflaged circuit $C_{camo}$ according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail, with reference to the figures, it is done so in connection with the illustrative embodiments and is not limited by the particular embodiments illustrated in the figures and the appended claims.

DETAILED DESCRIPTION OF EXEMPLARY EMBODIMENTS

Exemplary IC Camouflaging

IC camouflaging is a layout-level procedure that can hamper imaging-based reverse engineering. (See, e.g., References 2 and 33). Camouflaging introduces cells that look alike from the top view, but can implement one of many possible Boolean functions. On reverse engineering a camouflaged IC, an attacker cannot infer the correct functionality of the camouflaged cells by inspecting the layout through imaging techniques. (See, e.g., Reference 33). IC camouflaging can be performed by inserting dummy contacts (see, e.g., Reference 32), filler cells (see, e.g., Reference 2), programmable standard cells (sec. e.g., Reference 3), or a combination thereof.

An example of a camouflaged circuit is shown in the circuit diagram of FIG. 1B. The original circuit, as shown in the circuit diagram of FIG. 1A, can be denoted as $C_{orig}$, and its camouflaged version as $C_{camo}$. Both $C_{orig}$ and $C_{camo}$ have n inputs and m outputs. k gates have been camouflaged in $C_{camo}$. L represents the set of possible functions that a camouflaged gate can implement. The number of possible Boolean functions that $C_{camo}$ can implement can be $|L|^k$, only one of which can be the function implemented by $C_{orig}$.

For $C_{camo}$ shown in FIG. 1B, n=4, m=1, and k=2. Further, L={XOR, NAND, NOR}, for example, a camouflaged gate can be either an XOR, a NAND, or a NOR. The correct functionality of a camouflaged gate is illustrated by gates 105.

An assignment can include assigning a functionality from L to all the camouflaged gates. An assignment that leads to correct circuit out-put for all inputs i, for example, $\forall I \in \{0, 1\}^n$, $C_{camo}(i)=C_{orig}(i)$, can be referred to as a correct assignment. In FIG. 1B, (NAND, XOR) can be the correct assignment for the camouflaged gates ($G_1$, $G_2$), respectively.

When the gates to be camouflaged can be selected randomly, an attacker can infer the correct functionality of the camouflaged gates by sensitizing the camouflaged gate outputs to the primary outputs of the circuit, (See, e.g., Reference 27). As a countermeasure against this attack, clique based selection ("CBS") of camouflaged gates has been introduced, (See, e.g., Reference 27). CBS can camouflage a set of gates such that the output of a camouflaged gate in the set cannot be sensitized to a primary output of the design without accounting for other camouflaged gates in that set; this set of camouflaged gates can be referred to as a clique, (See, e.g., Reference 27).

Exemplary DeCamo Attack

CBS (see, e.g., Reference 27), and all the other camouflaged gate selection procedures, can be vulnerable to a recent Boolean satisfiability ("SAT") based decamouflaging attack, (e.g., DeCamo attack). (See, e.g., Reference 23). A DeCamo attack needs a functional chip to be used as an oracle, as well as a camouflaged netlist for example, the netlist obtained through reverse engineering the layout. The objective of the attacker can be to obtain a functional netlist by assigning the correct functionality to each camouflaged gate, for example, by determining the correct assignment. The attack can employ a SAT solver to compute discriminating input(s) ("DIs"). A DI can be an input pattern that, when applied to a camouflaged netlist, can produce an incorrect output for an incorrect assignment. The DIs can be used to eliminate the incorrect assignments. By computing and applying the DIs iteratively, an attacker can eliminate all incorrect assignments and extract the correct assignment.

The complexity for a successful attack can be represented in terms of |SDI is the number of OK in the set of discriminating inputs ("SDI"). (See, e.g., Reference 23). An attacker can seek to minimize the attack effort and time by minimizing |SDI|. A DeCamo attack can have decamouflaged ISCAS'85 benchmark circuits, with up to 128 camouflaged gates (e.g., out of a maximum of 19K gate) with |SDI|≤45. (See, e.g., Reference 23). Even though the computational complexity of the attack is believed to be in PSPACE, the empirical results can indicate that |SDI|, for the attack, can increase only linearly with the number of camouflaged gates. (See, e.g., Reference 23). A DeCamo attack is currently a major impediment to the adoption of IC camouflaging as a defense against the reverse engineering of ICs.

Exemplary Protection of Minterms

Previous IC camouflaging procedures attempted to protect the entire design (e.g., all the minterms). (See, e.g., Reference 27). However these procedures are susceptible to a DeCamo attack. Thus, a selected set of minterms can be protected in the exemplary design. Protecting the minterms can be a useful feature in the following exemplary scenarios:

Exemplary Scenario 1: Controllers, usually implement one-hot encoding on their activation signals. (See, e.g., Reference 25). Hiding the minterm that signals the activation of a particular state can enable IP protection. Without identifying this state, the resultant finite state machine ("FSM") can be different from that of the original FSM. (See, e.g., Reference 20).

Exemplary Scenario 2: Access control mechanisms, such as password checkers, enable "valid" signals only for the correct password, (e.g., a particular combination of inputs or a minterm). Thus, one needs to protect those circuits from reverse engineering.

Exemplary Scenario 3: Interrupt controllers can initiate interrupts based on a certain combination of processor states, (e.g., a particular combination of signals feeding the interrupt controller).

Exemplary Scenario 4: Most hardware-security modules help software security procedures use a "go/no-go" signal, "yes/no" signal or "error/no-error" signal to indicate a safe execution. Examples of such modules include Dynamic Trusted Platform Module (see, e.g., Reference 17), Secure Return Address Stack (see, e.g., Reference 21), TrustNet and Datawatch. (See, e.g., Reference 36). Protecting the minterm that activates these signals can help hide their checking mechanism, making them difficult to bypass.

Exemplary Scenario 5: There can be certain bits in a design, referred to as Architecturally Correct Execution ("ACE") bits, whose correctness must be ensured overall correct operation. (See, e.g., Reference 24). Applying logic perturbation on the ACE bits can ensure that an incorrect circuit operation, will be obtained by a reverse engineering attacker.

The exemplary, CamoPerturb can be used to render a design IP resilient against a DeCamo attack. (See, e.g., Reference 23). The exemplary CamoPerturb, contrary to all the existing camouflaging procedures, can perturb the functionality of the given design minimally by, for example, adding or removing one minima, rather than camouflaging the design. A separate camouflaged block, CamoFix, can restore the perturbed minterm, recovering the functionality of the design. The perturbed minterm ears be the designer's secret.

The exemplary system, method and computer-accessible medium, according to an exemplary embodiment of the present disclosure, can be used to protect the design IP by hiding a part of its functionality; a perturbed function can be implemented by toggling the output for one of the minterms, and the perturbed minterm can be restored by a separate camouflaged block, (e.g., CamoFix). As the logic perturbation can be minimal, each DI can be restricted to, for example, eliminating at most one incorrect assignment; thwarting the de-camouflaging attacks and all other attacks that iteratively prune the search space. (See, e.g., Reference 14).

The exemplary system, method and computer-accessible medium, according to an exemplary embodiment of the present disclosure, can increase the DeCamo attack effort, for example, |SDI|, exponentially, while the area, power and delay overhead grow linearly, all with respect to the number of camouflaged gates. The effectiveness of the exemplary approach can be illustrated on the ISCAS'85 benchmark circuits and the controllers of OpenSPARC microprocessor. (See, e.g., References 15 and 35).

A DeCamo attack (see, e.g., Reference 23) can attempt to break IC camouflaging under the following exemplary threat model:

1) The attacker has a functional chip, which can be bought from the market.

2) The attacker has a camouflaged netlist, which can be obtained by reverse engineering a chip using various procedures. (See, e.g., Reference 34).

3) The attacker knows which gates in the netlist can be camouflaged, and the set of functionalities that can possibly be implemented by a camouflaged gate.

4) The attacker cannot probe the internal wires of the circuit in the IC, as this capability diminishes quickly at small feature sizes.

A DeCamo attack can rely on iteratively determining DIs. When a DI i' can be applied to two instances of $C_{camo}$ with two different assignments $X_1$ and $X_2$, the output of the two instances can be different, for example, $C_{camo_{x1}}(i') \neq C_{camo_{x2}}(i')$. The attack can employ a SAT solver to compute the DIs.

An identified DI can be applied to the functional chip that implements $C_{orig}$. The chip response $C_{orig}(i')$ can be used to eliminate the incorrect assignments that can lead to a response that can differ from the one obtained from the chip. Subsequently, a new DI can be determined, and this process can be repeated until all the incorrect assignments can be determined, resulting in a successful attack. The output of the attack cart be a correct assignment for $C_{camo}$. The execution time of DeCamo attack can be proportional to |SDI|.

For example, consider the circuit $C_{camo}$ in FIG. 1B. Table 1 below illustrates the correct and the incorrect assignments for the camouflaged gates in $C_{camo}$. For the correct assignment (e.g., NAND, XOR) to (e.g., $G_1$, $G_2$), the output can be correct (√) for all DIs. The incorrect outputs corresponding to incorrect assignments are marked as x's. The DI returned by the SAT solver in the first iteration can be $I_3, I_2, I_1, I_0)=(1, 1, 0, 0)$. This input pattern, denoted as column "12" in Table 1, can identity six incorrect assignments to ($G_1$, $G_2$): (XOR, NAND), (XOR, NOR), (NAND, NAND), (NAND, NOR), (NOR, NAND), and (NOR, NOR). To identify further incorrect assignments, the DI (0, 0, 1, 1) can be used in the second iteration. This DI can reduce the search space to two assignments: (NAND, XOR) and (NOR, XOR). In the third iteration, the DI (0, 1, 1, 1) can be used, which deems (NOR, XOR) an incorrect assignment, thereby identifying (NAND, XOR) as the correct assignment. Therefore, |SDI|=3 for the circuit in FIG. 1B.

TABLE 1

DIs have varying strength in discriminating incorrect assignments for the camouflaged circuit $C_{camo}$ in FIG. 1B. "√" denotes a correct output, "X" denotes an incorrect output.

| Camo gates | DI | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 1 | 12 | 13 | 14 | 15 |
| XOR XOR | X | √ | √ | X | √ | √ | √ | √ | √ | √ | √ | √ | √ | √ | √ | √ |
| XOR NAND | √ | √ | √ | X | √ | √ | √ | √ | √ | √ | √ | √ | X | √ | √ | √ |

TABLE 1-continued

DIs have varying strength in discriminating incorrect assignments for the camouflaged circuit $C_{camo}$ in FIG. 1B. "✓" denotes a correct output, "X" denotes an incorrect output.

| Camo gates | DI 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| XOR NOR | ✓ | X | X | X | ✓ | ✓ | ✓ | ✓ | ✓ | ✓ | ✓ | ✓ | X | X | X | ✓ |
| NAND XOR | ✓ | ✓ | ✓ | ✓ | ✓ | ✓ | ✓ | ✓ | ✓ | ✓ | ✓ | ✓ | ✓ | ✓ | ✓ | ✓ |
| NAND NAND | ✓ | ✓ | ✓ | ✓ | ✓ | ✓ | ✓ | ✓ | ✓ | ✓ | ✓ | ✓ | X | ✓ | ✓ | ✓ |
| NAND NOR | ✓ | ✓ | ✓ | ✓ | ✓ | ✓ | ✓ | ✓ | ✓ | ✓ | ✓ | ✓ | X | X | X | ✓ |
| NOR XOR | ✓ | ✓ | ✓ | ✓ | X | ✓ | ✓ | X | X | ✓ | ✓ | ✓ | ✓ | ✓ | ✓ | ✓ |
| NOR NAND | ✓ | ✓ | ✓ | ✓ | ✓ | ✓ | ✓ | X | ✓ | ✓ | ✓ | X | X | ✓ | ✓ | ✓ |
| NOR NOR | ✓ | ✓ | ✓ | ✓ | ✓ | X | X | X | ✓ | X | X | X | X | X | X | ✓ |

Exemplary Thwarting DeCamo Attack

The exemplary system, method and computer-accessible medium, according to an exemplary embodiment of the present disclosure, can be used to secure IC camouflaging against DeCamo attack in the aforementioned threat model.

Exemplary Discriminating Ability of DIs

Table 1 above shows that, for example, if the DI (1, 1, 0, 1) in column 13 had been selected in the first iteration of the DeCamo attack, it would have eliminated only three incorrect assignments in one iteration. On the other hand, the DI (1, 1, 0, 0) in column 12 that was used in the attack eliminated six incorrect assignments. So, the DI (1, 1, 0, 0) has a higher discriminating ability than the DI (1, 1, 0, 1), DIs with higher discriminating ability can lead to a smaller |SDI|, as the number of incorrect assignments eliminated per DI can be higher.

A DeCamo attack can be effective as it can identify DIs with high discriminating ability and find a correct assignment with a small |SDI|. Existing camouflaged gate selection procedures fail to account for the discriminating ability of individual Dis, and can thus be vulnerable to the attack. (See, e.g., Reference 27). For example, a DeCamo attack was able to successfully decamouflage ISCAS'85 benchmark circuits, with up to 128 camouflaged gates out of a maximum of 19K gates, with |SDI|<45. A reduction of up to 5× in the execution time by exploiting incremental SAT solving procedure was also achieved. (See, e.g., Reference 14).

As discussed above, the state-of-the-art camouflaging procedures can be broken by identifying effective discriminating input patterns and resolving the camouflaged gate functionalities. As all the existing camouflaging procedures transform a subset of selected gates to camouflaged ones without changing the design IP functionality, these procedures can be at the mercy of how effective input patterns can be as discriminating patterns. To protect against these powerful attacks, the effectiveness of discriminating patterns needs to be reduced.

The exemplary system, method and computer-accessible medium, according to an exemplary embodiment of the present disclosure, contrary to all the existing camouflaging procedures, can apply a simple transformation to a given design, and modify its functionality rather than camouflaging it; the response of the function to one of the minterms can be toggled. This operation can be referred to as minterm perturbation. A separate camouflaged block (e.g., CamoFix) can restore this perturbance, recovering the functionality of the design. The minterm that can be perturbed can be the designer's secret, and can dictate the design of CamoFix.

The exemplary transformed design, when successfully reverse engineered, can be minimally different than the original design; they can differ in their outputs corresponding to the perturbed minterm only, and can be identical otherwise. Thus, the truth tables can be different in a single entry. An attacker needs to identity the secret perturbed minterm to fully reverse engineer the design IP. For that, the attacker can be forced to reverse engineer and recover CamoFix.

While the attacker can use a functional chip as an oracle, the simulated model can always minimally mismatch the oracle (e.g., one entry in the original truth table). Any attack on camouflaging (e.g., a DeCamo) will have to go through a tremendous computational effort to identity this minimal difference (e.g., perturbed minterm), the number of minterms can be exponential in the number of inputs. This can also reflect on an |SDI| that can be exponential in the number of inputs; due to the way CamoFix can be designed, |SDI| can be exponential in the number of camouflaged gates as well.

Exemplary CamoPerturb

An exemplary scenario for DeCamo attack can occur when each DI can eliminate at most one incorrect assignment; the |SDI| can then be maximum. To attain this resistance, the functionality of the original circuit Corig can be split into two parts as shown in the circuit diagram of FIG. 2A. A perturbed logic circuit $C_{pert}$, in which the original logic circuit $C_{orig}$ can be perturbed by adding or erasing a minterm, for example, for all minterms of except for one:

$$C_{orig} \oplus C_{pert} = 0 \tag{1}$$

Figures 2A, 2B:
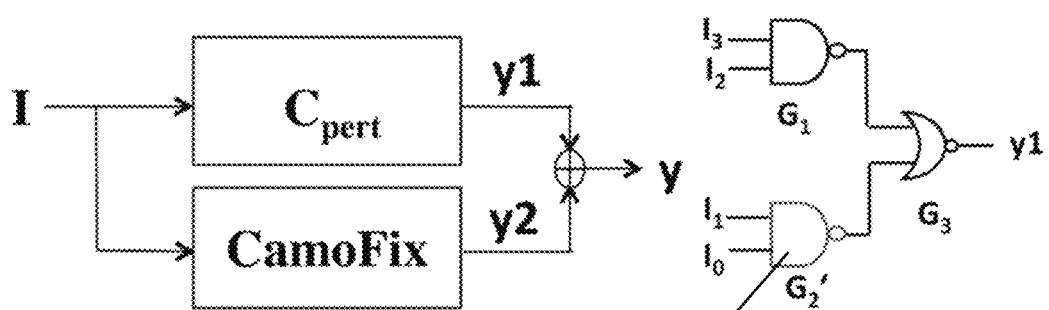
FIG. 2A is an exemplary circuit diagram of a perturbed logic circuit $C_{pert}$ and a CamoFix circuit according to an exemplary embodiment of the present disclosure.
FIG. 2B is an exemplary circuit diagram of a perturbed logic circuit $C_{pert}$ according to an exemplary embodiment of the present disclosure.

FIG. 2B shows an exemplary circuit diagram, which illustrates that using the NAND gate $G_2$ (e.g., element 205) instead of the XOR gate, $G_2$, of $C_{orig}$ can remove the minterm $(m_{12}=I_3 I_2 I_1 'I_0')$ in $C_{pert}$. The resulting truth table for the output y1 demonstrated in Table 2 below shows the removed minterm m_12. A CamoFix logic that removes or restores this perturbation for the minterm to restore the logic function of $C_{orig}$:

$$C_{amoFix} = C_{orig} \oplus C_{pert} \tag{2}$$

where y2 can therefore be a one-hot signal that produces a 1 only for the perturbed minterm. In Table 2, the trust table for CamoFix output y2 is shown for the example in FIGS. 2A and 2B.

TABLE 2

Truth table for $C_{pert}$ output y1 and CamoFix output (y2), y2 when XORed with y1 restores the original logic function y of $C_{orig}$.

| | I3, I2, I1, I0 | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| y1 | 0 | 0 | 0 | 0 | 0 | 0 | 0 | 0 | 0 | 0 | 0 | 0 | 0 | 0 | 0 | 1 |
| y2 | 0 | 0 | 0 | 0 | 0 | 0 | 0 | 0 | 0 | 0 | 0 | 0 | 1 | 0 | 0 | 0 |
| y  | 0 | 0 | 0 | 0 | 0 | 0 | 0 | 0 | 0 | 0 | 0 | 0 | 1 | 0 | 0 | 1 |

The overall circuit comprising Cpert and the CamoFix can be referred to as CamoPerturb. A reverse engineer must determine the functionality of the CamoFix to extract Corig. With the CamoFix unknown to the attacker, the attacker will be left with Cpert, which can differ from Corig by exactly one minterm that was protected.

Exemplary CamoFix Block

A CamoFix can include inverter ("INV")/buffer ("BUF") camouflaged gates that hard-code and hide the perturbed minterm. A CamoFix can check whenever the perturbed minterm can be received at the inputs. To prevent hard-coding of the secret (e.g., perturbed minterm), the exemplary CamoFix can utilize a camouflaged transformation, function as well; the hard-coded secret can then be made different from the perturbed minterm. The transformed inputs can be compared against the hard-coded secret; the match can occur only when the perturbed minterm can be received as input to the CamoFix, which can produce a 1 in that case.

The exemplary functionality of CamoFix is illustrated in Table 3 below. Each row in the table corresponds to a choice of the camouflaged (e.g., hard-coded) secret ("CS"), for example, an assignment of the camouflaged gates in the CamoFix. The highlighted row illustrates the actual hard-coded secret, for example, the correct assignment. The correct assignment can produce the desired 1 at the CamoFix output only for the perturbed minterm $m_{12}$. All the other (e.g., incorrect) assignments can produce a 1 for one minterm, which can differ from the perturbed minterm.

Minterms as DIs can be considered. Each DI, except for the perturbed minterm, can eliminate one incorrect assignment to CS; this incorrect assignment is denoted as x in Table 3. Therefore, the attack needs as many DIs as the number of incorrect assignments. Thus, the number of DIs utilized can be exponential in the number of camouflaged gates in CamoFix. In Table 3, |SDI|=15. In general, for k camouflaged gates, $|SDI|=2^k-1$.

As shown in the circuit diagram of FIG. 3A, the CamoFix circuit can include, e.g., three blocks: (1) Camo SecGen 305, (ii) Camo Input Mapping 310, and (iii) Camo SecCheck 315, Camo SecGen 305 and Camo SecCheck 315 can set y2 high only when the input corresponds to the perturbed minterm of Cpert.

Exemplary Inverter/Buffer Camouflaged Gate

Figure 4:
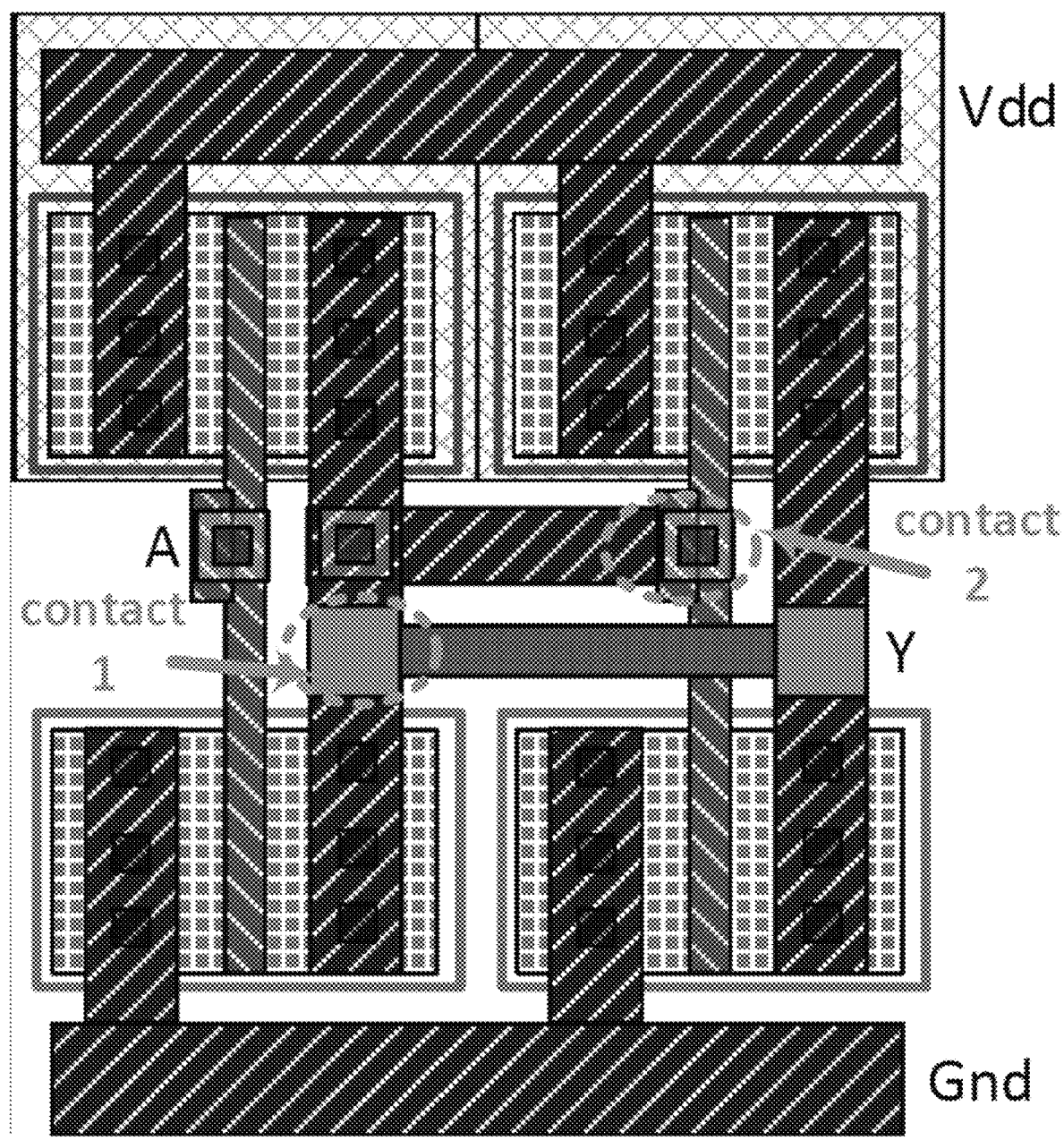
FIG. 4 is an exemplary diagram of the camouflaged layout of an inverter/buffer cell according to an exemplary embodiment of the present disclosure.

The exemplary building block of CamoFix can be an INV/BUF camouflaged gate, whose exemplary layout is shown in the layout diagram of FIG. 4. The functionality of the gate can be determined by the circled contacts (e.g., contact 1 and contact 2) being either real or dummy contacts. The exemplary input-output characteristics of the camouflaged INV/BUF cell are shown in the graph of FIG. 5A, which illustrates voltage at A (e.g., element 505) and voltage at Y (e.g., element 510), and FIG. 5B shows a graph that illustrates an exemplary functionality of the cell when configured as an INV or a BUF.

Exemplary Camo SecGen

Camo SecGen, shown in an exemplary circuit diagram of FIG. 3B, can include an array of INV/BUF camouflaged gates 320 that can generate the camouflaged secret ("CS") signal. The correct assignment to Camo SecGen can dictate the value of CS. The width of the CS signal, denoted as |CS|, also can denote the number of camouflaged gates in Camo SecGen. The width of CS can equal the number of input bits n.

TABLE 3

DeCamo attack resilient CamoFix: at most one assignment leads to an incorrect output for any DI. "✓" denotes a correct output, "X" denotes an incorrect output.

| I3, I2, I1, I0 | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| y2 | | 0 | 0 | 0 | 0 | 0 | 0 | 0 | 0 | 0 | 0 | 0 | 0 | 0 | 0 | 0 | 0 |
| CS | INV INV INV INV | ✓ | ✓ | ✓ | ✓ | ✓ | ✓ | ✓ | ✓ | ✓ | ✓ | X | ✓ | ✓ | ✓ | ✓ | ✓ |
|    | INV INV INV BUF | ✓ | ✓ | ✓ | ✓ | ✓ | ✓ | ✓ | ✓ | ✓ | ✓ | ✓ | X | ✓ | ✓ | ✓ | ✓ |
|    | INV INV BUF INV | ✓ | ✓ | ✓ | ✓ | ✓ | ✓ | ✓ | ✓ | X | ✓ | ✓ | ✓ | ✓ | ✓ | ✓ | ✓ |
|    | INV INV BUF BUF | ✓ | ✓ | ✓ | ✓ | ✓ | ✓ | ✓ | ✓ | ✓ | X | ✓ | ✓ | ✓ | ✓ | ✓ | ✓ |
|    | INV BUF INV INV | ✓ | ✓ | ✓ | ✓ | ✓ | ✓ | ✓ | ✓ | ✓ | ✓ | ✓ | ✓ | ✓ | ✓ | X | ✓ |
|    | INV BUF INV BUF | ✓ | ✓ | ✓ | ✓ | ✓ | ✓ | ✓ | ✓ | ✓ | ✓ | ✓ | ✓ | ✓ | ✓ | ✓ | X |
|    | INV BUF BUF INV | ✓ | ✓ | ✓ | ✓ | ✓ | ✓ | ✓ | ✓ | ✓ | ✓ | ✓ | ✓ | ✓ | ✓ | ✓ | ✓ |
|    | INV BUF BUF BUF | ✓ | ✓ | ✓ | ✓ | ✓ | ✓ | ✓ | ✓ | ✓ | ✓ | ✓ | ✓ | X | ✓ | ✓ | ✓ |
|    | BUF INV INV INV | ✓ | ✓ | X | ✓ | ✓ | ✓ | ✓ | ✓ | ✓ | ✓ | ✓ | ✓ | ✓ | ✓ | ✓ | ✓ |
|    | BUF INV INV BUF | ✓ | ✓ | ✓ | X | ✓ | ✓ | ✓ | ✓ | ✓ | ✓ | ✓ | ✓ | ✓ | ✓ | ✓ | ✓ |
|    | BUF INV BUF INV | X | ✓ | ✓ | ✓ | ✓ | ✓ | ✓ | ✓ | ✓ | ✓ | ✓ | ✓ | ✓ | ✓ | ✓ | ✓ |
|    | BUF INV BUF BUF | ✓ | X | ✓ | ✓ | ✓ | ✓ | ✓ | ✓ | ✓ | ✓ | ✓ | ✓ | ✓ | ✓ | ✓ | ✓ |
|    | BUF BUF INV INV | ✓ | ✓ | ✓ | ✓ | ✓ | ✓ | X | ✓ | ✓ | ✓ | ✓ | ✓ | ✓ | ✓ | ✓ | ✓ |
|    | BUF BUF INV BUF | ✓ | ✓ | ✓ | ✓ | ✓ | ✓ | ✓ | X | ✓ | ✓ | ✓ | ✓ | ✓ | ✓ | ✓ | ✓ |
|    | BUF BUF BUF INV | ✓ | ✓ | ✓ | ✓ | X | ✓ | ✓ | ✓ | ✓ | ✓ | ✓ | ✓ | ✓ | ✓ | ✓ | ✓ |
|    | BUF BUF BUF BUF | ✓ | ✓ | ✓ | ✓ | ✓ | X | ✓ | ✓ | ✓ | ✓ | ✓ | ✓ | ✓ | ✓ | ✓ | ✓ |

Exemplary Property 1: Without direct access to the outputs of Camo SecGen, an attacker cannot infer the CS value through reverse engineering. There can be $2^n$ options to explore for the attacker, as each camouflaged, gate can Implement either a BUF or an INV.

Exemplary Camo Input Mapping

Camo Input Mapping can generate n 1-bit mappings f:I ↦ CI by using INV/BUF camouflaged gates 325 as shown in an exemplary the circuit diagram of FIG. 3C. The resulting n-bit transformation, determined by the correct assignment to Camo Input Mapping, can be in the form of a subset of the input bits inverted. If this block did not exist, CS would have to be hardcoded to the perturbed minterm. With this block, the equality check discussed below can be broken in an unknown manner.

Exemplary Property 2: in FIG. 3C, the array of INV/BUF camouflaged gates 325 can hide the mapping f:I ↦ CI from the attacker. Without direct access to the Camo Input Mapping outputs, there can be $2^n$ possible mappings to explore for the attacker. As the mapping can be unknown to the attacker, CI can also be unknown.

FIG. 3D shows an exemplary circuit design of an exemplary Camo SecCheck according to an exemplary embodiment of the present disclosure. As shown in FIG. 3D, y2 can be high when CS=CI.

Exemplary Camo SecCheck

The Camo SecCheck can include an array of XNOR gates that can set y2 high when CS and CI have the same value. Thus, for each CI value, y2 can be set high for exactly one assignment (CS) to Camo SecGen.

Exemplary Property 3: While the attacker knows that the equality of CI and CS can set y2 high, the attacker cannot determine the corresponding correct assignment to the camouflaged secret CS that can be equal to CI. The attacker thus has $2^n$ options for CS to explore.

Exemplary Security Properties of CamoFix

As shown in FIG. 3A, Camo SecCheck can be driven by CS and CI, which can be the outputs of Camo SecGen and Camo Input Mapping, respectively. The total number of camouflaged gates in CamoFix can be 2n. The output of CamoFix can be y2 which can be a 1-bit signal.

For example, as shown in the diagram of FIG. 3B, |CS|=n=4, the correct assignment to Camo SecGen can be (INV, BUF, BUF, INV), and the corresponding correct CS value can be (0, 1, 1, 0). The correct assignment to Camo Input Mapping, shown in FIG. 3C, can be (INK BUF, INF, BUF). In Camo SecCheck, y2 can be set high when CI=CS. In the camouflaged chip with the CamoFix circuitry in place, y2 can be high for the perturbed minterm $m_0=(I_3\ I_2\ I_1'\ I_0')$, only. All incorrect assignments to CS on the reverse-engineered netlist, however, can set y2 high for an incorrect minterm, rendering the output y incorrect. The correspondence between the DIs and the one and only incorrect assignment they discriminate, can be dictated by the mapping implemented by Camo Input Mapping. For the incorrect assignment (BUF, BUF, BUF, BUF) to Camo SecGen, the incorrect CS value can be (1, 1, 1, 1); the DI that transforms to (1, 1, 1, 1) through Camo Input Mapping can be (0, 1, 0, 1), for example, the DI in column 5 in Table 3.

Exemplary CamoFix Property 1: Emit DI Discriminates at Most One Incorrect Assignment That is Unknown to the Attacker Exemplary Proof 1: Suppose an attacker applies DI i to CamoFix. From exemplary Property 2, the corresponding CI i' can be unknown to him/her and can be unique; i' can be dictated, by Camo Input Mapping that can implement a bijective function unknown to the attacker. Also from exemplary Property 1 and exemplary Property 3, the attacker does not know the correct value of CS. There can be two cases two consider. In the first case, the assignment to CS can be incorrect. As y2 may only be high when CS=i', there may be only one incorrect CS value that i will discriminate. As the correspondence between i and i' can be unknown (e.g., exemplary property 2), the correspondence between i and this incorrect CS value can also be unknown. Second, if the assignment to CS can be correct, no assignment will be discriminated.

CamoFix Property 2: Attack Complexity is Exponential in the Number of Camouflaged Gates in Camo SecGen Exemplary Proof 2: For k camouflaged gates in Camo SecGen, the number of incorrect assignments can be $2^k-1$. In order to reveal the correct assignment to CS, the DeCamo attacker can attempt to determine all incorrect assignments with as few DIs as possible. However, from exemplary CamoFix Property 1, as each DI can determine only one incorrect assignment, the number of DIs (|SDI|) utilized can be the same as that of number of incorrect assignments to CS. In other words, the attack complexity can be the number of incorrect assignments to CS, which can be exponential in k.

Exemplary Results

Exemplary Experimental Configuration

The effectiveness of the exemplary system, method and computer-accessible medium, according to an exemplary embodiment of the present disclosure, can be demonstrated against a DeCamo attack (see, e.g., Reference 23) using empirical attack results. Lingeling SAT solver can be used to find the DIs. (See, e.g., Reference 7). The exemplary experiments can be conducted on ISCAS'85 benchmark circuits and the controllers of OpenSPARC microprocessor. (See, e.g., References 15 and 35). In the OpenSPARC processor, fpuDiv can be the controller of the floating-point divider, and fpuIn can manage the operands of the floating-point divider, ifuDcl and ifuIfq can be in the instruction fetch unit of the processor controlling the decoder logic and fetch queue, respectively. lsuExp, lsuStb and lsuRw can be in the load-store unit managing the exceptions, store-buffer units, and the read-write units. tluMmu can handle the trap-logic unit. The DeCamo attack (see, e.g., References 14 and 23) can be executed on a server with 6-core Intel Xeon W3690 CPU, running at 3.47 GHz, with 24 GB RAM.

The baseline for comparison can be the CBS (see, e.g., Reference 27), the exemplary procedure that had been previously used for evaluation of the DeCamo attack. (See, e.g., Reference 23). It can be assumed that for CBS circuits, L={NAND, NOR} and k=|CS|, for example, the number of gates selected for camouflaging by CBS can be the same as the size of the camouflaged secret.

The attack results can be reported for |CS| values ranging from about 8 to about 13. These |CS| values may appear small at a first glance, as one would expect results for more realistic |CS| values such as about 64 or about 128. However, since the execution time of the attack grows exponentially with |CS|, it would take about a week to break a CamoPerturb circuit with |CS|=20. Thus, |CS| can be constrained to be kept small in generating the empirical attack results.

Exemplary Security-Analysis

Figure 6:
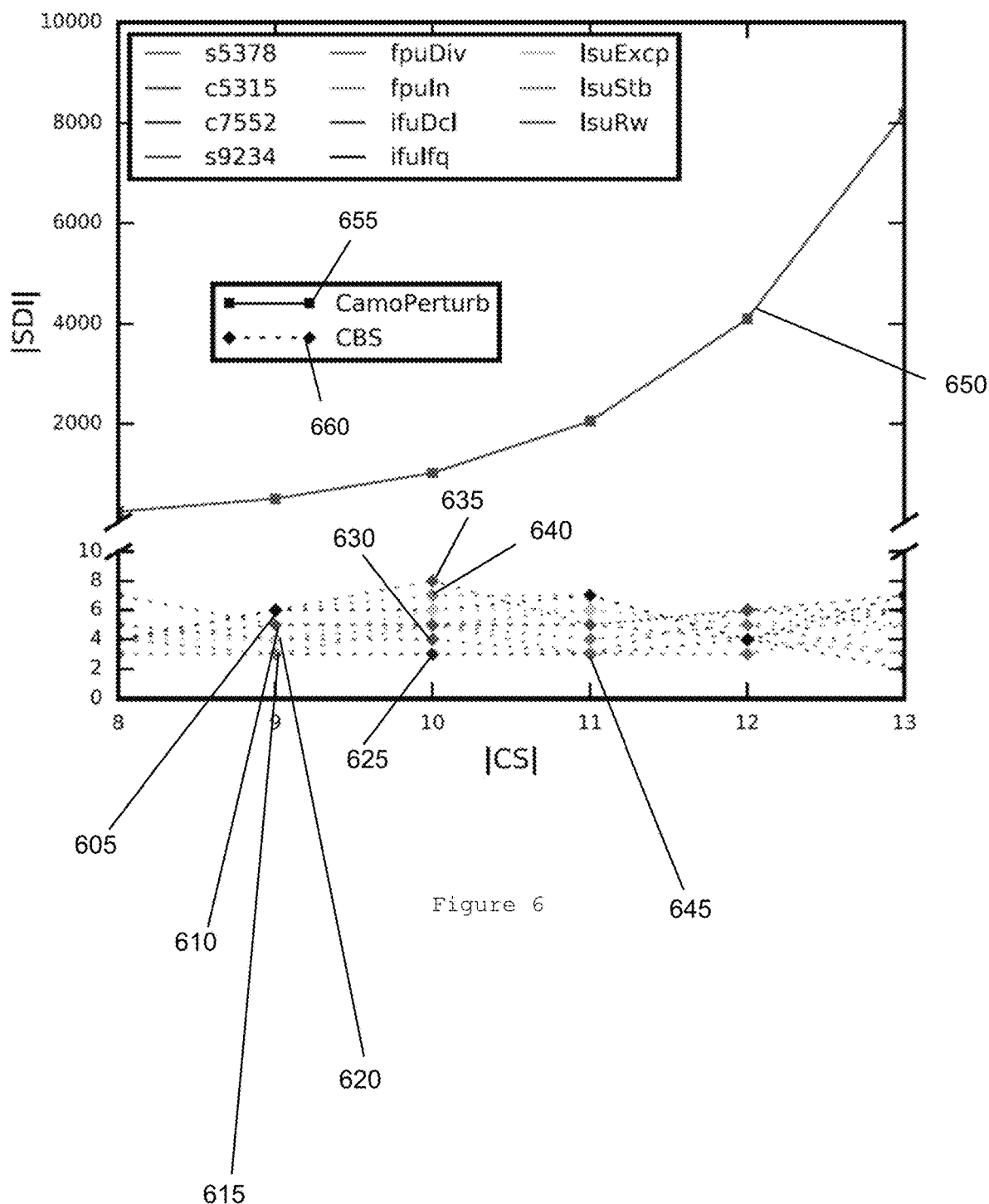
FIG. 6 is an exemplary graph illustrating a set of discriminating inputs for a DeCamo attack, on clique-based selection and CamoPerturb circuits according to an exemplary embodiment of the present disclosure.

Exemplary Attack complexity: FIG. 6 shows an exemplary graph of |SDI| for the exemplary CBS circuits (e.g., element 660) (see, e.g., Reference 27) and exemplary Camo Perturb circuits (e.g., element 655). For example, as shown in FIG. 6, the exemplary CamoPerturb circuits can include IsuRw (e.g., element 650). The exemplary BS circuits can include, for example, (i) ifulfq (e.g., element 605), (ii) IsuRw (e.g., element 610), (iii) IsuStb (e.g., element 615), (iv) IsuExco (e.g., element 620), (v) c7552 (e.g., element 6625), (vi) s9234 (e.g., element 630), (vii) c5315 (e.g., element 635), (viii) fpuln (e.g., element 640), and (ix) fpuDiv (e.g., element 645). The exemplary CBS circuits can be broken using only a few DIs ($|SDI|\leq 10$)). On the other hand, $|SDI|$ for the CamoPerturb circuits can grow exponentially with $|CS|$, since the CamoPerturb can restrict the discriminating ability of the individual DIs. For all the CamoPerturb circuits, $|SDI|=2^{|CS|}-1$. The exemplary plots for all CamoPerturb circuits can coincide, resulting in one exponentially growing line 650.

Figure 7:
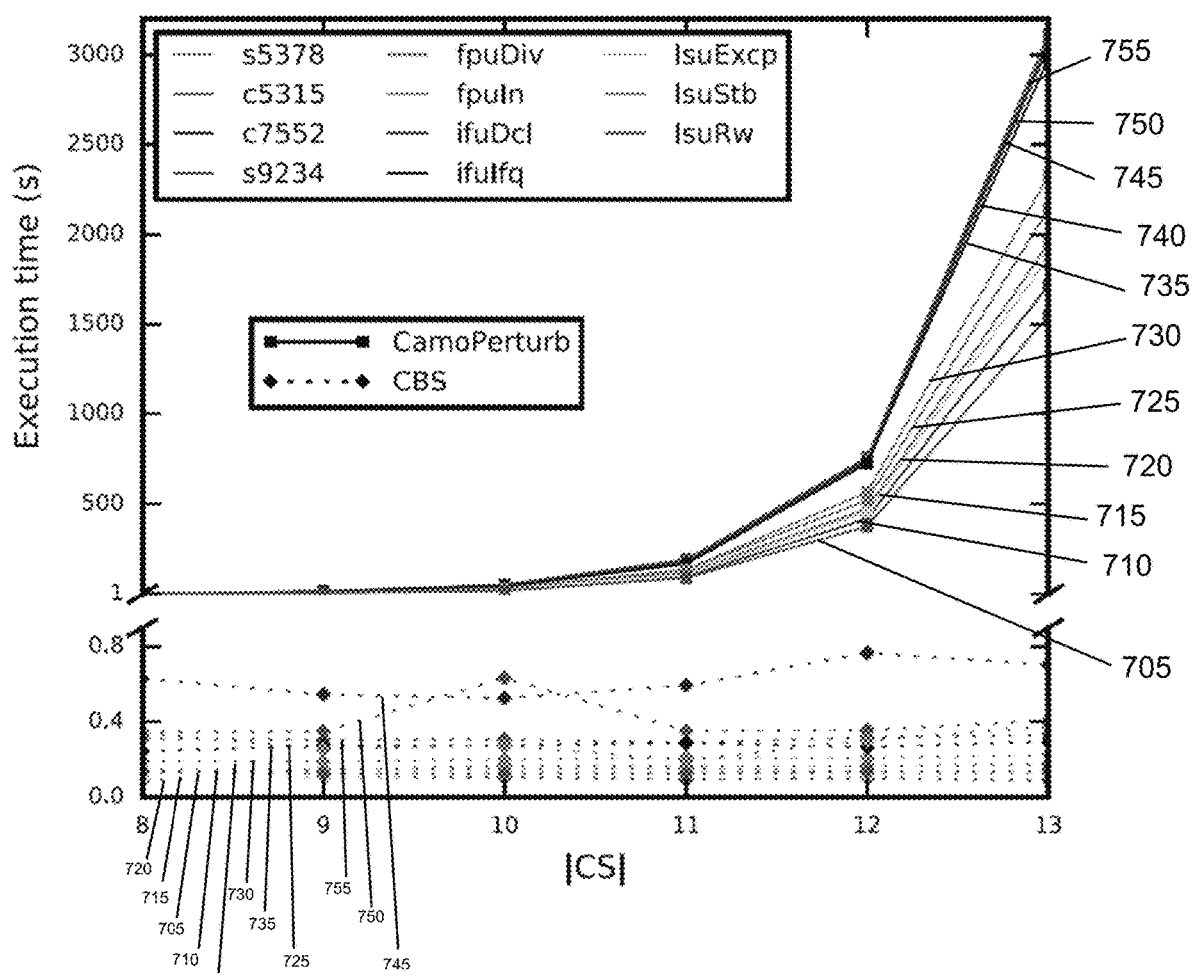
FIG. 7 is an exemplary graph illustrating execution time(s) of a DeCamo attack on clique-based selection and CamoPerturb circuits according to an exemplary embodiment of the present disclosure.

Exemplary Execution time: FIG. 7 shows than exemplary diagram where the execution time of the DeCamo attack on any CBS (see, e.g., Reference 27) circuit can be less than a second. For example, FIG. 7 illustrates (i) IsuRW (e.g., element 705), (ii) ifuDel (e.g., element 710), (iii) IsuExcp (e.g., element 715), (iv) fpuln (e.g., element 720), (v) IsuStb (e.g., element 725), (vi) s5378 (e.g., element 730), (vii) ifulfq (e.g., element 735), (viii) c5315 (e.g., element 740), (ix) c7552 (e.g., element 745), and (x) fpuDiv (e.g., element 755). This demonstrates the vulnerability of camouflaged gate selection procedures that fail to account for the discriminating ability of the DIs. The execution time of the attack on CamoPerturb circuits, however, can increase exponentially with $|CS|$. While $|SDI|$ can double with each increment in $|CS|$, the corresponding change in the execution time cam be even higher $-3\times$ to $4\times$ for most of the circuits. This can be because, e.g., in each iteration of the attack, the SAT formula can be updated based on the new DI and chip response. The execution time can vary across the benchmark circuits as the number of clauses in the SAT formula of each circuit can be different. The DeCamo attack on c5315 CamoPerturb circuit, with $|CS|=20$, did not complete in 48 hours.

Exemplary Area, Power and Delay Overhead

Figure 8:
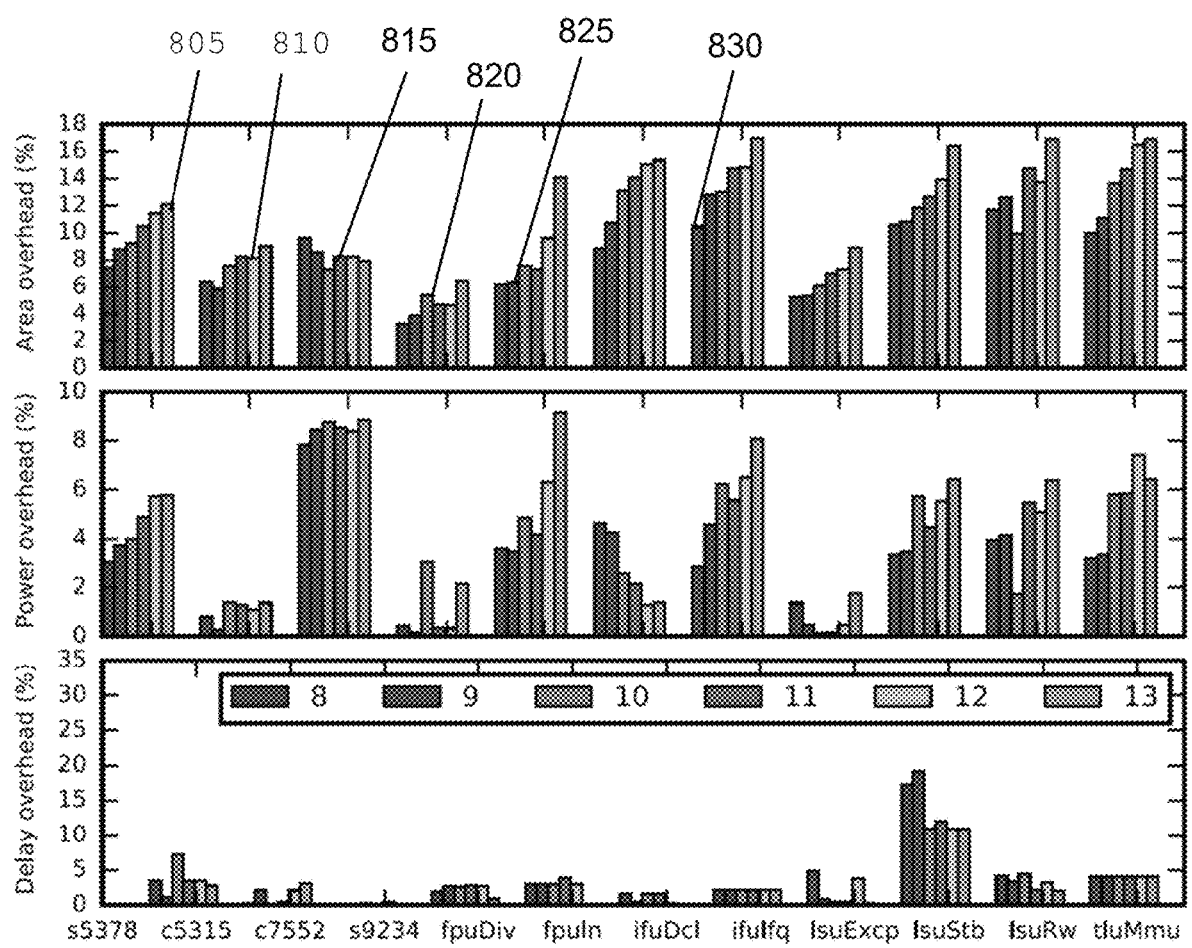
FIG. 8 is a set of exemplary charts illustrating area, power, and delay overhead of Camo Perturb for different values of |CS| according to an exemplary embodiment, of the present disclosure.

Table 4 below shows the exemplary overhead of INV/BUF and NAND/NOR camouflaged gates with respect to their standard counterparts. Camouflaging can introduce significant performance overhead and the designer must carefully choose the gates to be camouflaged to control the performance overhead. As CamoPerturb camouflages only CamoFix, and not the original circuit, the delay penalty can be quite small. FIG. 8 shows a graph of the exemplary overhead for the CamoPerturb circuits having different values, for example, (i) value 8 (e.g., element 830), (ii) value 9 (e.g., element 825), (iii) value 10 (e.g., element 820), (iv) value 11 (e.g., element 815). (v) value 12 element 810), and (vi) value 13 (e.g., element 805). The average delay overhead of CamoPerturb can be minimal (e.g., about 1%).

TABLE 4

Overhead of camouflaged cells over their standard counterparts.
The inverter and buffer are designed to look alike.
The NAND and NOR gates are designed to look alike.

| Gate | Delay (%) | Power (%) | Area (%) |
|---|---|---|---|
| Inverter | 9.9 | 1.6 | 71.4 |
| Buffer | 0 | 0 | 0 |
| NAND | 1.0 | 19.1 | 8.9 |
| NOR | 34.6 | 12.7 | 64.8 |

Exemplary Comparison with Existing Procedures

Table 5 below shows an exemplary comparison of CamoPerturb with existing camouflaged gate selection procedures: (i) random selection ("RS"), (ii) output corruptibility based selection ("OCS", (iii) CBS, and (iv) CBS+OCS (see, e.g., Reference 27) for $|CS|=64$. RS can select the gates to be camouflaged on a random basis. OCS aims to maximize the corruptibility at the output, which can be measured in terms of the Hamming distance at the outputs. (See, e.g., Reference 27). CBS can prevent the sensitization attack by selecting and camouflaging those gates that form a clique. (See, e.g., Reference 27).

While the DeCamo attack can break all existing camouflaged gate selection procedures with $|SDI|\leq 45$, it will take $|SDI|=1.8\times 10^{19}$ to break the exemplary CamoPerturb. The average area, power and delay overhead of CamoPerturb can be about 49.1%, about 24.4% and about 1.2%, respectively. The delay and power overhead of the exemplary CamoPerturb can be the lowest among all the procedures; the power overhead can be relatively lower as the switching activity introduced by CamoFix can be restricted mainly to the CamoFix block, which can form only a fraction of the overall circuit. The exemplary CamoPerturb can exhibit significantly higher resistance (e.g., exponential vs. linear) against the DeCamo attack, whereas its average area, power and delay overhead can either be smaller or comparable to those of the existing camouflaged gale selection techniques.

TABLE 5

Comparison of CamoPerturb with the existing procedures for $|CS| = 64$.
$|SDI|$ and execution time for CamoPerturb are extrapolated.
It is assumed that an attacker can generate one billion DIs per second.

| Metric | RS | OCS | CBS | CBS + OCS | CamoPerturb |
|---|---|---|---|---|---|
| $|SDI|$ | 26 | 16.0 | 15.0 | 27.0 | 18E19 |
| Exec. Time (s) | 0.5 | 0.5 | 0.4 | 0.6 | 18E10 |
| Area (%) | 41.0 | 26.8 | 41.0 | 39.8 | 49.1 |
| Power (%) | 50.8 | 50.6 | 58.2 | 48.3 | 24.4 |
| Delay (%) | 7.6 | 11.6 | 8.6 | 5.4 | 1.2 |

Exemplary Case Study: OpenSPARC T1 Core

Figure 9:
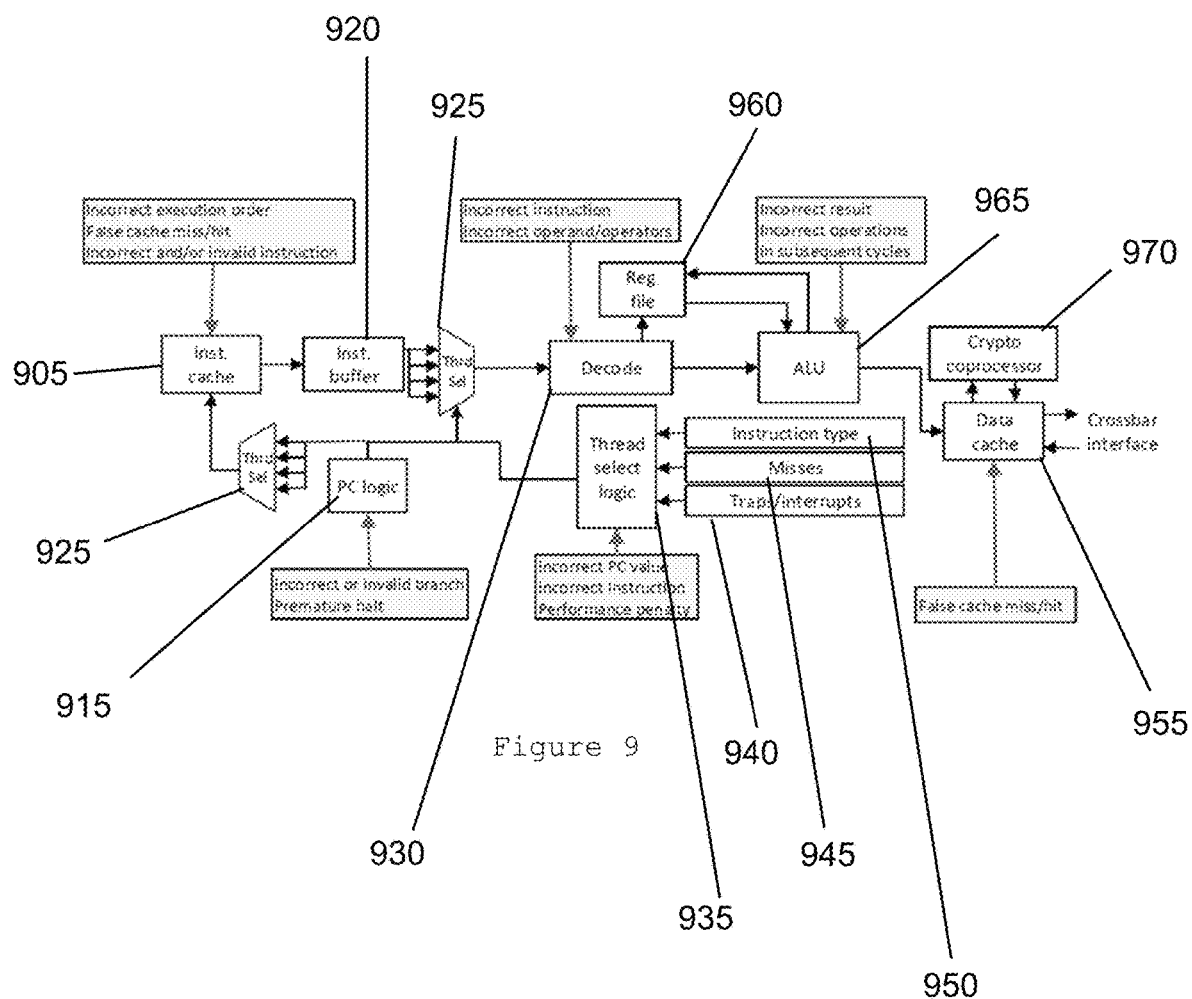
FIG. 9 is an exemplary schematic diagram of OpenSPARC core pipeline components according to an exemplary embodiment of the present disclosure.

A designer can select the logic to perturb based on the impact of the perturbation on the overall system. This impact can be illustrated using the OpenSPARC T1 microprocessor core. (See, e.g., Reference 35). The exemplary components in the exemplary OpenSPARC core, such as arithmetic logic unit ("ALU") 965, program counter ("PC") logic 915 and Decoder 930 are shown in the schematic diagram of FIG. 9. (See, e.g., Reference 35). The processor can use multithreading, and the thread select logic unit 935 can generate the control signals needed for scheduling of the threads based on one or more of the instruction type 950, the misses 945, and/or the traps/interrupts 940. The PC register can hold the address of the next instruction. The instruction specified by the PC logic 915 can be fetched and stored in the instruction cache 905, and then provided to the instruction buffer 920 to be input into the thread select unit 925. The Decode unit 930 can decode the instruction, the ALU 965 can perform the arithmetic/logical computations and the data cache 955 can hold the results computed by the ALU 965, which can be encrypted using crypto processor 970. Information from the decode unit 930 and the ALU 965 can be stored in a register file 960.

The impact of perturbation on each component can be highlighted next to the component. As an example, the PC register can hold the address of next instruction to be executed. When a single bit in the PC can be toggled due to perturbation, the next instruction address will be incorrect, and the program flow will be modified incorrectly. Similarly, perturbation in the ALU logic can lead to incorrect results, which can also alter the program flow in subsequent execution cycles.

Exemplary Discussion

CamoFix combats DeCamo attack by setting output y2 high for-only one incorrect assignment to CS for any DI. This implies that the circuit output can be correct for many incorrect assignments, leading to low output corruptibility. There exists a dichotomy between output corruptibility and |SDI|. While it has been argued that that output corruptibility may not necessarily improve |SDI| (see, e.g., Reference 14), the exemplary system, method and computer-accessible medium, according to an exemplary embodiment of the present disclosure, can demonstrate that a higher output corruptibility can lead to a lower |SDI|, as the resulting DIs can have high discriminating ability.

When high corruptibility can be beneficial, OBS (see, e.g., Reference 27) can be employed to camouflage the parts of IC that may not be integrated with the CamoFix. Although the additional camouflaged gates will not contribute towards DeCamo attack resistance, they can improve the output corruptibility.

The exemplary CamoFix can be integrated with one or more outputs. For example, the exemplary CamoFix can be integrated with a single output. However, it can be possible to have multiple independent CamoFix blocks, each protecting a distinct output. The security of CamoFix can be based on the exemplary CamoFix block, with the largest |CS|.

To share a single exemplary CamoFix block between multiple outputs in an effort to lower the overhead, one has to take into account if there can be any common inputs in the transitive fanouts of the respective outputs. When inputs in the transitive fanouts under consideration can be tire same, the CamoFix output can be asserted for a specific minterm, (e.g., $m_i$). The respective circuits can then be perturbed by toggling the response for the minterm $m_i$. When inputs in the transitive fanouts under consideration may not be the same, a large CamoFix circuit with, the union of the inputs can be designed. However, each perturbed signal may have to take additional inputs, leading to high overhead.

Exemplary Low-Overhead Camouflaging

It may often not be feasible to integrate CamoFix with the entire design due to constraints on circuit overhead. To reduce the overhead, CamoFix can be selectively applied on only the crucial parts of the design. For instance, controllers typically represent the most valuable IP in processors. Yet they occupy only a small area on a chip (approximately 1%), (See, e.g., Reference 1). In resource-constrained settings, protecting the controllers alone can help achieve the security objectives at a minimal overhead on the overall system. Flipping one critical output of a controller can severely corrupt the overall operation of a microprocessor. (See, e.g., Reference 18).

The exemplary system, method and computer-accessible medium, according to an exemplary embodiment of the present disclosure, can utilize CamoFix in order to protect against reverse engineering where the threat model considers the foundry to be trusted. CamoFix can be adapted to also protect against an untrusted foundry by leveraging programmable camouflaged cells. (See, e.g., Reference 3). The programmable cells can have control inputs that can be driven by on-chip tamper-proof memory dictating the assignment to the camouflaged cells. CamoFix logic implemented with programmable INV/BUF cells can enable the designer to program these cells upon fabrication and load the correct assignments to Camo Input Mapping and Camo SecGen; these assignments can act as the secret that can protect the design from all untrusted parties, including the foundry.

Reverse engineering methods can extract the IP, device technology or sensitive data from an IC. (See, e.g., References 11, 33 and 34). Reverse engineering can also involve extracting a behavioral-level netlist from the gate-level netlist. (See, e.g., Reference 31). IC camouflaging can hamper layout-level reverse engineering by introducing cells that can implement different functions, but appear indistinguishable to a reverse engineering attacker. (See, e.g., Reference 32). The layouts of the cells can be made to look alike by using dummy contacts (see, e.g., Reference 32) or doped implants. (See, e.g., References 5 and 22). After reverse engineering, an attacker has to determine the correct assignment to the camouflaged gates to extract a functional netlist. The higher the number of functions that can be implemented by a camouflaged cell, the higher the ambiguity for the attacker. Emerging technologies, such as silicon nanowires, can be leveraged to create camouflaged cells that can support a larger number of functions compared to their CMOS counterparts. (See, e.g., Reference 6). A designer can also increase the ambiguity for the attacker by filling the unused spaces in the layout with filler cells (see, e.g., Reference 2), additional racial interconnects, or vias. (See, e.g., References 2 and 12). Metals that transform to their look-alike insulator counterparts (e.g., Mg and MgO), on being exposed to chemical reagents during the delayering process, can be used to create real and dummy interconnects. (See, e.g., Reference 9). During delayering, the metal can transform into an insulator, and an attacker cannot differentiate between the real and dummy interconnects. The exemplary camouflaging procedure can be orthogonal to all these camouflaging technologies, and can be applicable to any of them.

In addition to IC camouflaging, logic encryption (see, e.g., References 4, 8, 26, and 29), IC metering (see, e.g., Reference 19), and split manufacturing (see, e.g., Reference 16) have been developed to thwart the IP piracy and reverse engineering attacks. These procedures can hide the functionality and implementation of a design by inserting extra hardware and/or modifying the design or manufacturing flow. Logic encryption (see, e.g., References 4, 8, 26 and 29) can use an explicit secret key to encrypt the chip functionality. The design is not functional without the secret key. The secret key, however, needs to be stored in a tamper-proof memory. IC metering assigns a unique ID to each manufactured IC with the objective of tracking and/or controlling the IC during its lifetime. (See, e.g., Reference 19). In split manufacturing, the layout, can be split into two parts that can be manufactured in two different foundries, and then stacked together to get a functional design. (See, e.g., Reference 16).

Exemplary Conclusion

Existing camouflaged gate selection procedures can be vulnerable to the DeCamo attack as they fail to take into account the discriminating ability of inputs. The attack can break these procedures with a few discriminating input patterns. The exemplary procedure, CamoPerturb, can increase the attack complexity exponentially in the number of camouflaged gates by restricting the attacker to eliminate at most one incorrect assignment per discriminating input. This can be accomplished by hiding the response of the original circuit to one (e.g., secret) minterm. The area, power and delay overhead, of CamoPerturb can be comparable to those of the existing camouflaging procedures. By thwarting the DeCamo and other attacks. CamoPerturb can revive IC camouflaging and can render it an effective defense against reverse engineering.

Figure 10:
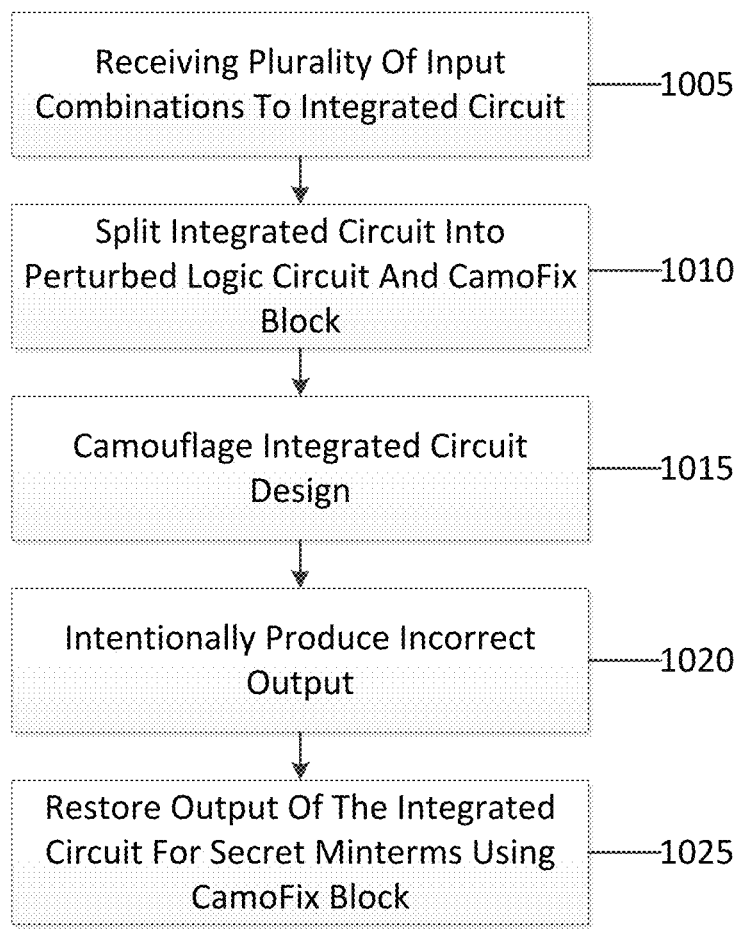
FIG. 10 is an exemplary flow diagram of a method for camouflaging a design of an integrated circuit according to an exemplary embodiment of the present disclosure.

FIG. 10 shows an exemplary flow diagram of a method for camouflaging a design of an integrated circuit according to an exemplary embodiment of the present disclosure. For example, at procedure 1005, information related to a plurality of input combinations to the IC can be received. At procedure 1010, the IC can be split into a perturbed logic circuit and a CamoFix block. At procedure 1015, the design of the IC can be camouflaged. At procedure 1020, an incorrect output can be intentionally produced by the IC for a predetermined constant number of secret minterms of the IC. At procedure 1025, the correct outputs for the IC can be restored for secret minterms using the CamoFix block.

Figure 11:
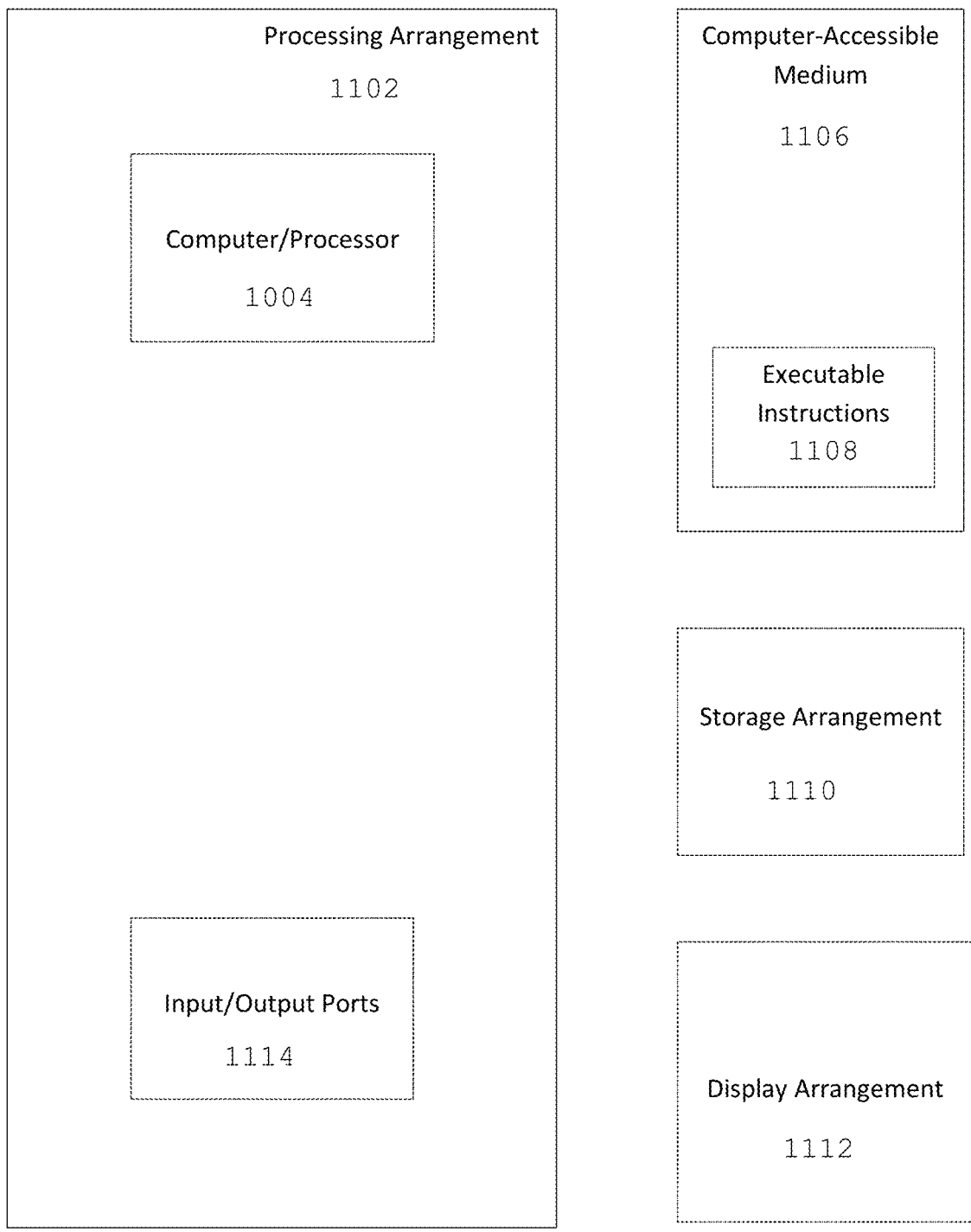
FIG. 11 is an illustration of an exemplary block diagram of an exemplary system in accordance with certain exemplary embodiments of the present disclosure.

FIG. 11 shows a block diagram of an exemplary embodiment of a system according to the present disclosure. For example, exemplary procedures in accordance with the present disclosure described herein can be performed by a processing arrangement and/or a computing arrangement 1102. Such processing/computing arrangement 1102 can be, for example entirely or a part of, or include, but not limited to, a computer/processor 1104 that can include, for example one or more microprocessors, and use instructions stored on a computer-accessible medium (e.g., RAM, ROM, hard drive, or other storage device).

As shown in FIG. 11, for example a computer-accessible medium 1106 (e.g., as described herein above, a storage device such as a hard disk, floppy disk, memory stick, CD-ROM, RAM, ROM, etc., or a collection thereof) can be provided (e.g., in communication with the processing arrangement 1102). The computer-accessible medium 1106 can contain executable instructions 1108 thereon. In addition or alternatively, a storage arrangement 1110 can be provided separately from the computer-accessible medium 1106, which can provide the instructions to the processing arrangement 1102 so as to configure the processing arrangement to execute certain exemplary procedures, processes and methods, as described herein above, for example.

Further, the exemplary processing arrangement 1102 can be provided with or include an input/output arrangement 1114, which can include, for example a wired network, a wireless network, the internet, an intranet, a data collection probe, a sensor, etc. As shown in FIG. 11, the exemplary processing arrangement 1102 can be in communication with an exemplary display arrangement 1112, which, according to certain exemplary embodiments of the present disclosure, can be a touch-screen configured for inputting information to the processing arrangement in addition to outputting information from the processing arrangement, for example. Further, the exemplary display 1112 and/or a storage arrangement 1110 can be used to display and/or store data in a user-accessible format and/or user-readable format.

The foregoing merely illustrates the principles of the disclosure. Various modifications and alterations to the described embodiments wilt be apparent to those skilled in the art in view of the teachings herein. It will thus be appreciated that those skilled in the art will, be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties:
[1] Y. Alkabani and F. Koushanfar. Active Hardware Metering for Intellectual Property Protection and Security. In *Proc. USENIX Security*, pages 291-306, 2007.
[2] J. P. Baukus, L. W. Chow, R. P. Cocchi. P. Ouyang, and B. J. Wang. Camouflaging a standard cell based integrated circuit. U.S. Pat. No. 8,151,235, 2012.
[3] J. P. Baukus, L. W. Chow, R. P. Cocchi, P. Ouyang, and B. X Wang, Building Block for a Secure CMOS Logic Cell Library. U.S. Pat. No. 8,111,089, 2012.
[4] A. Baumgarten, A. Tyagi, and J. Zambreno. Preventing IC Piracy Using Reconfigurable logic Barriers. *IEEE Design & Test of Computers*, 27(1):66-75, 2010.
[5] G. T. Becker, V. Regazzoni, C. Paar, and W. P. Burleson. Stealthy Dopant-Level Hardware Trojans. In *Cryptographic Hardware and Embedded Systems*, pages 197-214. Springer, 2013.
[6] Y. Bi, P.-E. Gaillardon, X. S. Hu, M. Niemier, J.-S. Yuan, and Y. Jin. Leveraging Emerging Technology for Hardware Security-Case Study on Silicon Nanowire FETs and Graphene SymFETs. In *Proc. IEEE Asian Test Symposium*, pages 342-347.
[7] A. Biere. Lingeling, Plingeling and Treengeling Entering the SAT Competition 2013. In *Proc. SAT Competition*, pages 51-52, 2013.
[8] R. Chakraborty and S. Bhunia, HARPOON: An Obfuscation-Based SoC Design Methodology for Hardware Protection. *IEEE Transactions on Computer-Aided Design of Integrated Circuits and System*, 28(10):1493-1502, 2009.
[9] S. Chen, J. Chen, D. Forte, J. Di, M. Tehranipoor, and L. Wang, Chip-Level Anti-Reverse Engineering Using Transformable Interconnects. In *Proc. IEEE Defect and Fault Tolerance in VLSI and Nanotechnology Systems*, pages 109-314, 2015.
[10] Chipworks. Reverse engineering software, http://www.chipworks.com/en/technical-competitive-analysis/resources/reerse-engineering-software. [Mar. 15, 2016].
[11] Chipworks. Intel's 22-nm Tri-gate Transistors Exposed, http://www.chipworks.com/blog/technologyblog/2012/04/23/intels-22-nm-tri-gate-transistors-exposed/, 2012, [Dec. 22, 2015].
[12] R. P. Cocchi, J. P. Baukus, L. W. Chow, and B. J. Wang. Circuit Camouflage Integration for Hardware IP Protection. In *Proc. IEEE/ACM Design Automation Conference*, pages 1-5, 2014.
[13] Degate.http://www.degate.org/documentation/. [Dec. 22, 2015].
[14] X. Z. Duo Liu, Cunxi Yu and D. Holcomb. Oracle-Guided Incremental SAT Solving to Reverse Engineer Camouflaged Logic Circuits. In *Proc. Design, Automation and Test in Europe*, 2016, to appear.

[15] M. C. Hansen, H. Yalcin, and J. P. Hayes. Unveiling the ISCAS-85 Benchmarks: A Case Study in Reverse Engineering. *IEEE Design & Test of Computers*, 16(3):72-80, 1999.

[16] R. W. Jarvis and M. G. McIntyre. Split Manufacturing Method for Advanced Semiconductor Circuits. U.S. Pat. No. 7,195,931, 2007.

[17] A. K. Kanuparthi, M. Zahran, and R. Karri. Feasibility Study of On-chip Dynamic Trusted Platform Module. *Proc. IEEE International Conference on Computer Design*, pages 1-6, 2010.

[18] N. Karimi, M. Maniatakos, A. Jas, and Y. Makris. On the Correlation between Controller Faults and instruction-Level Errors in Modern Microprocessors. In *Proc. IEEE International Test Conference*, pages 1-10, 2008.

[19] F. Koushanfar, Integrated Circuits Metering for Piracy Protection and Digital Rights Management: An Overview. In *Proc. Great Lakes Symposium on VLSI*, pages 449-454, 2011.

[20] F. Koushantar. Provably Secure Active IC Metering Techniques for Piracy Avoidance and Digital Rights Management, *IEEE Transactions on Information Forensics and Security*, (1):51-63, 2012.

[21] R. B. Lee, D. K. Karig, J. P. McGregor, and Z. Shi. Enlisting Hardware Architecture to Thwart Malicious Code Injection. *Proc. International Conference on Security in Pervasive Computing*, 2003.

[22] S. Malik, G. T. Becker, C. Paar, and W. P. Burleson, Development of a Layout-Level Hardware Obfuscation Tool. In *Proc. IEEE Computer Society Annual Symposium on VLSI*, pages 204-209, 2015.

[23] M. E. Massad, S. Garg, and M. V. Tripunitara. Integrated Circuit (IC) Decamouflaging: Reverse Engineering Camouflaged ICs within Minutes. In *Proc. Network and Distributed System Security Symposium*, 2015.

[24] S. S. Mukherjee, C. T. Weaver, J. S. Emer, S. K. Reinhardt, and T. M. Austin. Measuring architectural vulnerability factors. *IEEE Micro*, 23(6): 70-75, 2003.

[25] M. Nourani, J. Carletta, and C. Papachristou. Synthesis-for-Testability of Controller-datapath Pairs that use Gated Clocks. In *Proc. IEEE/ACM Design Automation Conference*, pages 613-618, 2000.

[26] J. Rajendran, Y. Pino, O. Sinanoglu, and R. Karri, Security Analysis of Logic Obfuscation. In *Proc. IEEE/ACM Design Automation Conference*, pages 83-89, 2012.

[27] J. Rajendran, M. Sam, O. Sinanoglu, and R. Karri. Security analysis of integrated circuit camouflaging; In *Proc. ACM Conference on Computer and Communications Security*, pages 709-720, 2013.

[28] M. Rostami, F. Koushanfar, and R. Karri, A Primer on Hardware Security: Models, Methods, and Metrics. *Proceedings of the IEEE*, 102(8): 1283-1295, 2014.

[29] J. Roy, F. Koushanfar, and I. Markov. EPIC: Ending Piracy of Integrated Circuits, *IEEE Computer*, 43(10):30-38, 2010.

[30] SEMI. Innovation is at risk as semiconductor equipment and materials industry loses up to $4 billion annually due to IP infringement. www.semi.org/en/Press/P043775, 2008, [Nov. 15, 2015].

[31] P. Subramanyan, N. Tsiskaridze, K. Pasricha, D. Reisman, A. Susnea, and S. Malik. Reverse Engineering Digital Circuits Using Functional Analysis. In *Proc. Design, Automation and Test in Europe*, pages 1277-1280, 2013.

[32] SypherMedia. Syphermedia library, http://www.smi.tv/syphermedia_library_circuit_camouflage_technology.html. [Apr. 22, 2016].

[33] R. Torrance and D. James. The State-of-the-Art in Semiconductor Reverse Engineering. In *Proc. IEEE/ACM Design Automation Conference*, pages 333-338, 2011.

[34] Chipworks. Texas Instruments 4377401 Baseband Processor TSMC 65 nm Process Transistor Characterization. http://www.chipworks.com/TOC/TI_4377401_TSMC_Bb_Processor_TCR-0703-801_TOC.pdf, [Nov. 15, 2015].

[35] Oracle. OpenSPARC T1 Micro Architecture Specification, http://www.oracle.com/technetwork/systems/opensparc/t1-01-opensparc1-micro-arch-1538959.html [Mar. 30, 2016].

[36] A. Waksman and S. Sethumadhavan. Tamper evident microprocessors. Proc. IEEE Symposium on Security and Privacy, pages 173-188, 2010.

What is claimed is:

1. A non-transitory computer-accessible medium having stored thereon computer-executable instructions for camouflaging a design of at least one integrated circuit (IC), wherein, when a computer hardware arrangement executes the instructions, the computer hardware arrangement is configured to perform procedures comprising:
   receiving information related to a plurality of input combinations to the at least one IC;
   separating the at least one IC into the at least one perturbed logic circuit and at least one further logic circuit, wherein the at least one perturbed logic circuit is generated by at least one of (i) adding at least one minterm to the at least one IC, or (ii) erasing the at least one minterm from the at least one IC;
   camouflaging the design of the at least one IC by limiting a discriminating ability of the input combinations to a predetermined constant number of incorrect assignments based on the at least one perturbed logic circuit and the at least one further logic circuit; and
   intentionally producing an incorrect output for a predetermined constant number of secret minterms of the at least one IC.

2. The computer-accessible medium of claim 1, wherein the computer hardware arrangement is further configured to restore an output of the at least one IC for the secret minterms using a CamoFix block.

3. The computer-accessible medium of claim 2, wherein the CamoFix block includes at least one of (i) at least one CamoInputMapping block, (ii) at least one CamoSecGen block, or (iii) at least one comparator block.

4. The computer-accessible medium of claim 3, wherein the computer hardware arrangement is configured to utilize the at least one CamoSecGen block to produce an on-chip secret information based on at least one camouflaged gate.

5. The computer-accessible medium of claim 3, wherein the computer hardware arrangement is configured to utilize the at least one CamoInputMapping block to transform the input combinations based on at least one camouflaged gate.

6. The computer-accessible medium of claim 3, wherein the computer hardware arrangement is configured to utilize the at least one comparator block to produce at least one restore signal if at least one on-chip secret matches at least one transformed circuit input.

7. The computer-accessible medium of claim 2, wherein the CamoFix block includes at least one of (i) at least one inverter camouflaged gate, or (ii) at least one buffer camouflaged gate.

8. The computer-accessible medium of claim 1, wherein the at least one further logic circuit is at least one CamoFix block.

9. The computer-accessible medium of claim 1, wherein the computer hardware arrangement is further configured to erase the at least one minterm by replacing at least one XOR gate in the at least one IC using at least one NAND gate.

10. The computer-accessible medium of claim 1, wherein the computer hardware arrangement is further configured to utilize the at least one CamoFix block to at least one of (i) remove a perturbation from the at least one perturbed logic circuit, or (ii) restore the perturbation from the at least one perturbed logic circuit.

11. The computer-accessible medium of claim 8, wherein the at least one CamoFix block includes at least one of (i) at least one inverter camouflaged gate, or (ii) at least one buffer camouflaged gate.

12. The computer-accessible medium of claim 11, wherein the at least one of (i) the at least one inverter camouflaged gate, or (ii) the at least one buffer camouflaged gate includes at least one dummy contact.

13. The computer-accessible medium of claim 12, wherein the computer hardware arrangement is further configured to utilize the at least one of (i) the at least one inverter camouflaged gate, or (ii) the at least one buffer camouflaged gate to generate at least one camouflaged secret signal.

14. The computer-accessible medium of claim 1, wherein the computer hardware arrangement is further configured to camouflage only at least one controller of the design.

15. The computer-accessible medium of claim 14, wherein the computer hardware arrangement is further configured to camouflage the at least one controller by flipping at least one critical output of the at least one controller.

16. A method for camouflaging a design of at least one integrated circuit (IC), comprising:
receiving information related to a plurality of input combinations to the at least one IC;
separating the at least one IC into the at least one perturbed logic circuit and at least one further logic circuit, wherein the at least one perturbed logic circuit is generated by at least one of (i) adding at least one minterm to the at least one IC, or (ii) erasing the at least one minterm from the at least one IC;
using a computer hardware arrangement, camouflaging the design of the at least one IC by limiting a discriminating ability of the input combinations to a predetermined constant number of incorrect assignments based on the at least one perturbed logic circuit and the at least one further logic circuit; and
intentionally producing an incorrect output for a predetermined constant number of secret minterms of the at least one IC.

17. A system for camouflaging a design of at least one integrated circuit (IC), comprising:
a computer hardware arrangement configured to:
receive information related to a plurality of input combinations to the at least one IC;
separating the at least one IC into the at least one perturbed logic circuit and at least one further logic circuit, wherein the at least one perturbed logic circuit is generated by at least one of (i) adding at least one minterm to the at least one IC, or (ii) erasing the at least one minterm from the at least one IC;
camouflage the design of the at least one IC by limiting a discriminating ability of the input combinations to a predetermined constant number of incorrect assignments based on the at least one perturbed logic circuit and the at least one further logic circuit; and
intentionally produce an incorrect output for a predetermined constant number of secret minterms of the at least one IC.

18. A circuit configuration comprising:
at least one perturbed logic circuit generated by at least one of (i) adding at least one minterm to the at least one IC, or (ii) erasing the at least one minterm from the at least one IC; and
at least one integrated circuit (IC) (i) having a discriminating ability for every input combination to the at least one IC, the discriminating ability being limited to a predetermined constant number of incorrect assignments based on the at least one perturbed logic circuit and (ii) intentionally producing an incorrect output for a predetermined constant number of secret minterms of the at least one IC.

* * * * *

UNITED STATES PATENT AND TRADEMARK OFFICE
CERTIFICATE OF CORRECTION

| | |
|---|---|
| PATENT NO. | : 10,642,947 B2 |
| APPLICATION NO. | : 15/697139 |
| DATED | : May 5, 2020 |
| INVENTOR(S) | : Ozgur Sinanoglu, Jeyavijayan Rajendran and Muhammad Yasin |

It is certified that error appears in the above-identified patent and that said Letters Patent is hereby corrected as shown below:

In the Specification

Please add a paragraph to include a Statement Regarding Federally Sponsored Research, under Column 1, after the "Cross-Reference to Related Application(s)" section, starting on Line 14, with the following paragraph:
"STATEMENT REGARDING FEDERALLY SPONSORED RESEARCH
This invention was made with government support under grant number W911NF-15-1-0278 awarded by the Department of Defense. Therefore, the government has certain rights in the invention."

Signed and Sealed this
Seventeenth Day of January, 2023

Katherine Kelly Vidal
*Director of the United States Patent and Trademark Office*